(12) United States Patent
Porat

(10) Patent No.: US 11,043,989 B2
(45) Date of Patent: *Jun. 22, 2021

(54) DOPPLER MIDAMBLE SIGNALING FOR WIRELESS COMMUNICATIONS

(71) Applicant: Avago Technologies International Sales Pte. Limited, Singapore (SG)

(72) Inventor: Ron Porat, San Diego, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 16/706,496

(22) Filed: Dec. 6, 2019

(65) Prior Publication Data
US 2020/0119777 A1 Apr. 16, 2020

Related U.S. Application Data

(63) Continuation of application No. 15/689,969, filed on Aug. 29, 2017, now Pat. No. 10,530,430, which is a
(Continued)

(51) Int. Cl.
*H04L 1/00* (2006.01)
*H04B 7/0413* (2017.01)
(Continued)

(52) U.S. Cl.
CPC ............. *H04B 7/0413* (2013.01); *H04L 1/00* (2013.01); *H04L 27/2602* (2013.01);
(Continued)

(58) Field of Classification Search
CPC .......................... H04B 7/0413; H04L 27/2621
See application file for complete search history.

(56) References Cited

U.S. PATENT DOCUMENTS 8,144,683 B1 * 3/2012 Sun ..................... H04L 27/2602
370/349
8,462,863 B1 * 6/2013 Zhang ................. H04L 27/2602
375/260

(Continued)

OTHER PUBLICATIONS

Non-Final Office Action for U.S. Appl. No. 15/689,969 dated May 17, 2019 (26 pages).
(Continued)

*Primary Examiner* — Parth Patel
(74) *Attorney, Agent, or Firm* — Foley & Lardner LLP

(57) ABSTRACT

A wireless communication device (alternatively, device, WDEV, etc.) includes at least one processing circuitry configured to support communications with other WDEV(s) and to generate and process signals for such communications. In some examples, the device includes a communication interface and a processing circuitry, among other possible circuitries, components, elements, etc. to support communications with other WDEV(s) and to generate and process signals for such communications. The wireless communication device is configured to generate an orthogonal frequency division multiplexing (OFDM) packet that includes a preamble followed by data symbol(s) followed by a midamble followed by other data symbol(s). The wireless communication device is also configured to transmit the OFDM packet to another wireless communication device to be processed by the other wireless communication device to perform channel estimation of a wireless communication channel using at least one of the preamble or the midamble.

20 Claims, 8 Drawing Sheets

Related U.S. Application Data continuation-in-part of application No. 15/161,360, filed on May 23, 2016, now Pat. No. 9,780,846, which is a continuation of application No. 13/954,492, filed on Jul. 30, 2013, now Pat. No. 9,350,505, which is a continuation-in-part of application No. 13/454,033, filed on Apr. 23, 2012, now Pat. No. 8,774,124.

(60) Provisional application No. 62/408,557, filed on Oct. 14, 2016, provisional application No. 61/699,045, filed on Sep. 10, 2012, provisional application No. 61/750,280, filed on Jan. 8, 2013, provisional application No. 61/774,801, filed on Mar. 8, 2013, provisional application No. 61/809,656, filed on Apr. 8, 2013, provisional application No. 61/842,601, filed on Jul. 3, 2013, provisional application No. 61/478,537, filed on Apr. 24, 2011, provisional application No. 61/493,577, filed on Jun. 6, 2011, provisional application No. 61/496,153, filed on Jun. 13, 2011, provisional application No. 61/501,239, filed on Jun. 26, 2011, provisional application No. 61/507,955, filed on Jul. 14, 2011, provisional application No. 61/512,363, filed on Jul. 27, 2011, provisional application No. 61/522,608, filed on Aug. 11, 2011, provisional application No. 61/542,602, filed on Oct. 3, 2011, provisional application No. 61/561,722, filed on Nov. 18, 2011, provisional application No. 61/577,597, filed on Dec. 19, 2011, provisional application No. 61/584,142, filed on Jan. 6, 2012, provisional application No. 61/592,514, filed on Jan. 30, 2012, provisional application No. 61/595,616, filed on Feb. 6, 2012, provisional application No. 61/598,293, filed on Feb. 13, 2012, provisional application No. 61/602,504, filed on Feb. 23, 2012.

(51) Int. Cl.
*H04L 27/26* (2006.01)
*H04W 84/12* (2009.01)
*H04L 25/02* (2006.01)
*H04L 1/06* (2006.01)

(52) U.S. Cl.
CPC ...... *H04L 27/2613* (2013.01); *H04L 27/2621* (2013.01); *H04B 2201/70706* (2013.01); *H04L 1/004* (2013.01); *H04L 1/0618* (2013.01); *H04L 25/0202* (2013.01); *H04L 27/2666* (2013.01); *H04W 84/12* (2013.01); *Y02D 30/70* (2020.08)

(56) References Cited

U.S. PATENT DOCUMENTS

| | | | | |
|---|---|---|---|---|
| 8,599,804 | B2* | 12/2013 | Erceg | H04B 7/043 370/338 |
| 2007/0201350 | A1* | 8/2007 | Papasakellariou | H04L 5/023 370/208 |
| 2009/0147868 | A1* | 6/2009 | Ihm | H04B 7/0684 375/260 |
| 2010/0254289 | A1* | 10/2010 | Lim | H04L 27/2602 370/280 |
| 2010/0296473 | A1* | 11/2010 | Kim | H04L 5/0053 370/329 |
| 2010/0312894 | A1* | 12/2010 | Awad | H04W 72/042 709/226 |
| 2011/0134778 | A1* | 6/2011 | Lim | H04J 3/1605 370/252 |
| 2011/0261730 | A1* | 10/2011 | Moon | H04L 27/2626 370/280 |
| 2011/0280232 | A1* | 11/2011 | Wu | H04W 28/06 370/338 |
| 2011/0305233 | A1* | 12/2011 | Seok | H04L 5/0023 370/338 |
| 2012/0027140 | A1* | 2/2012 | Weng | H04L 25/0232 375/350 |
| 2012/0046030 | A1* | 2/2012 | Siomina | G01S 1/20 455/423 |
| 2012/0093261 | A1* | 4/2012 | Kim | H04L 27/2627 375/299 |
| 2012/0176962 | A1* | 7/2012 | Kimura | H04W 16/26 370/315 |
| 2012/0294294 | A1* | 11/2012 | Zhang | H04L 29/0653 370/338 |
| 2012/0314588 | A1* | 12/2012 | Nammi | H04L 1/0027 370/252 |
| 2012/0327871 | A1* | 12/2012 | Ghosh | H04L 1/0041 370/329 |
| 2013/0040692 | A1* | 2/2013 | Chen | H04W 36/32 455/525 |
| 2016/0080056 | A1* | 3/2016 | Porat | H04B 7/06 370/329 |
| 2016/0080186 | A1* | 3/2016 | Porat | H04L 27/2602 375/260 |
| 2016/0197755 | A1* | 7/2016 | Barriac | H04L 27/2613 370/350 |
| 2017/0324522 | A1* | 11/2017 | Porat | H04L 5/0007 |
| 2018/0006687 | A1* | 1/2018 | Porat | H04L 27/2602 |
| 2018/0145733 | A1* | 5/2018 | Verma | H04L 5/0091 |
| 2018/0359066 | A1* | 12/2018 | Mu | H04L 27/2613 |

OTHER PUBLICATIONS

Notice of Allowance for U.S. Appl. No. 15/689,969 dated Aug. 30, 2019 (8 pages).

* cited by examiner

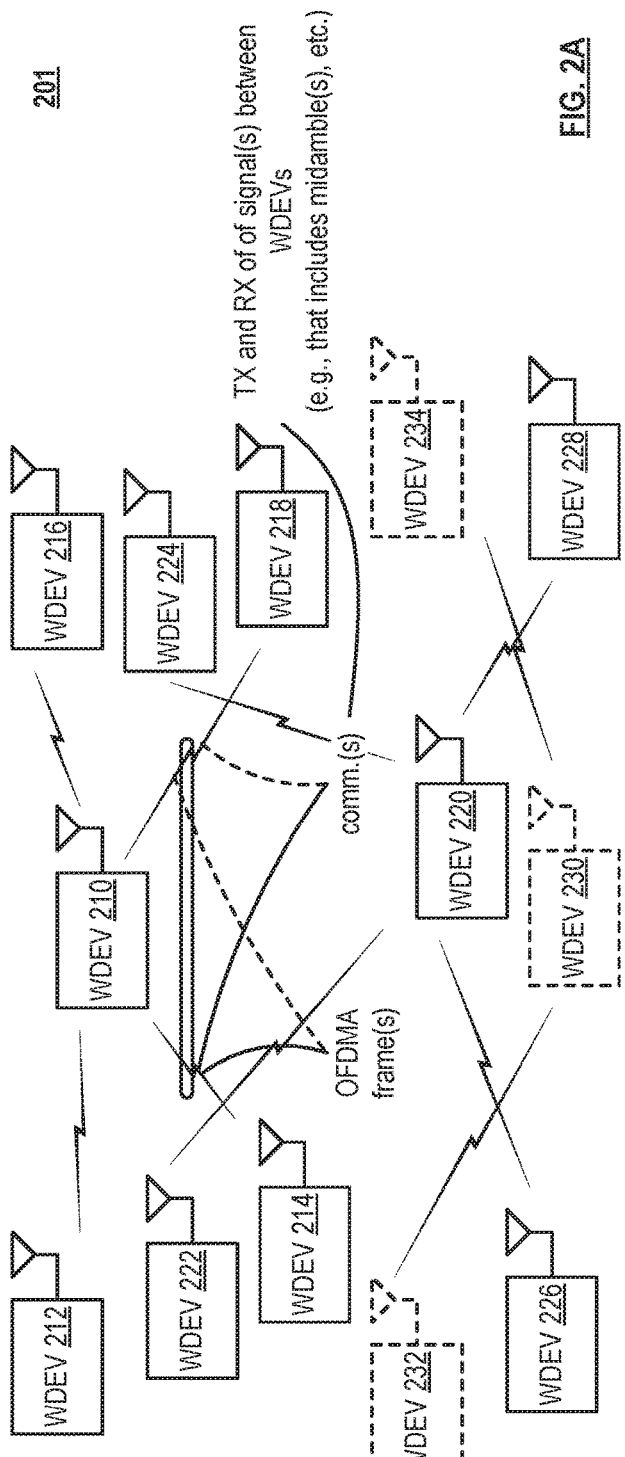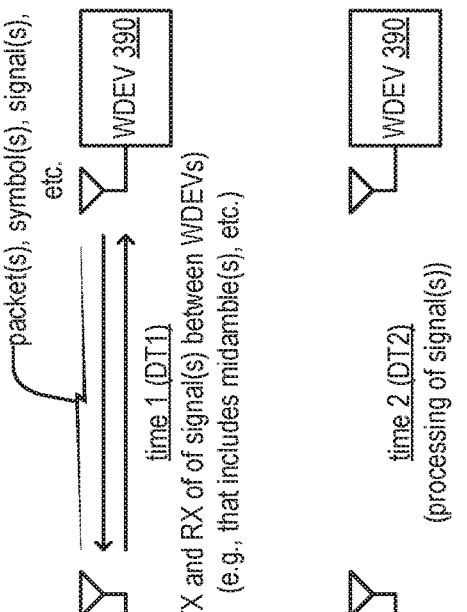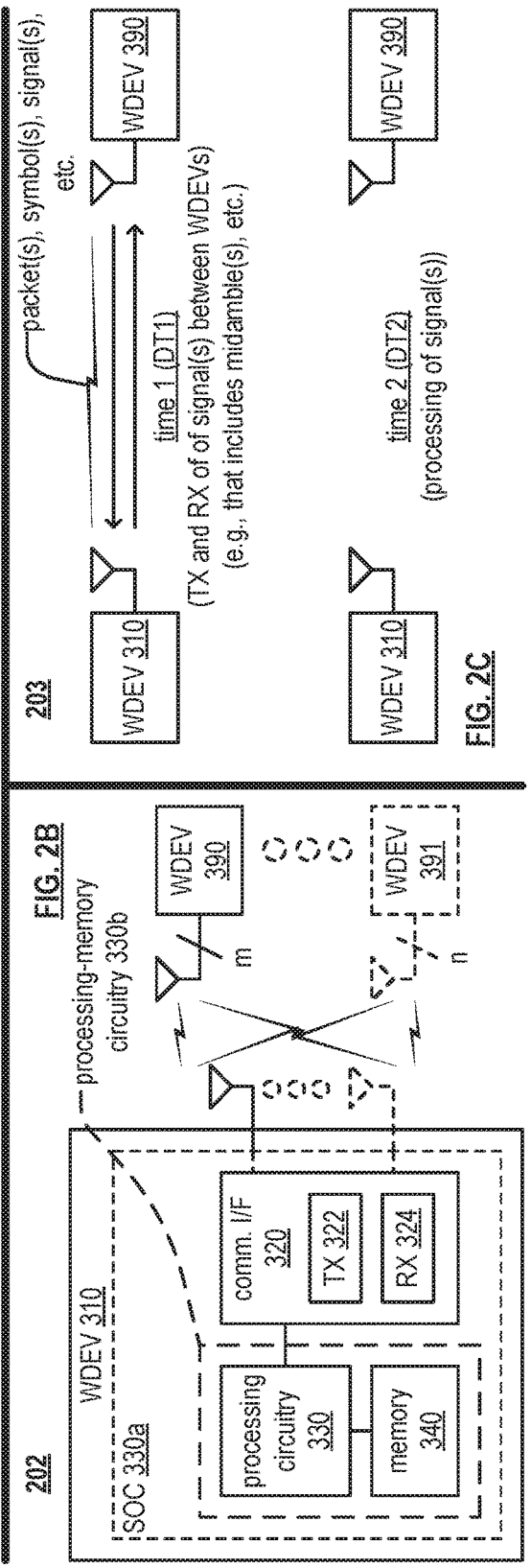

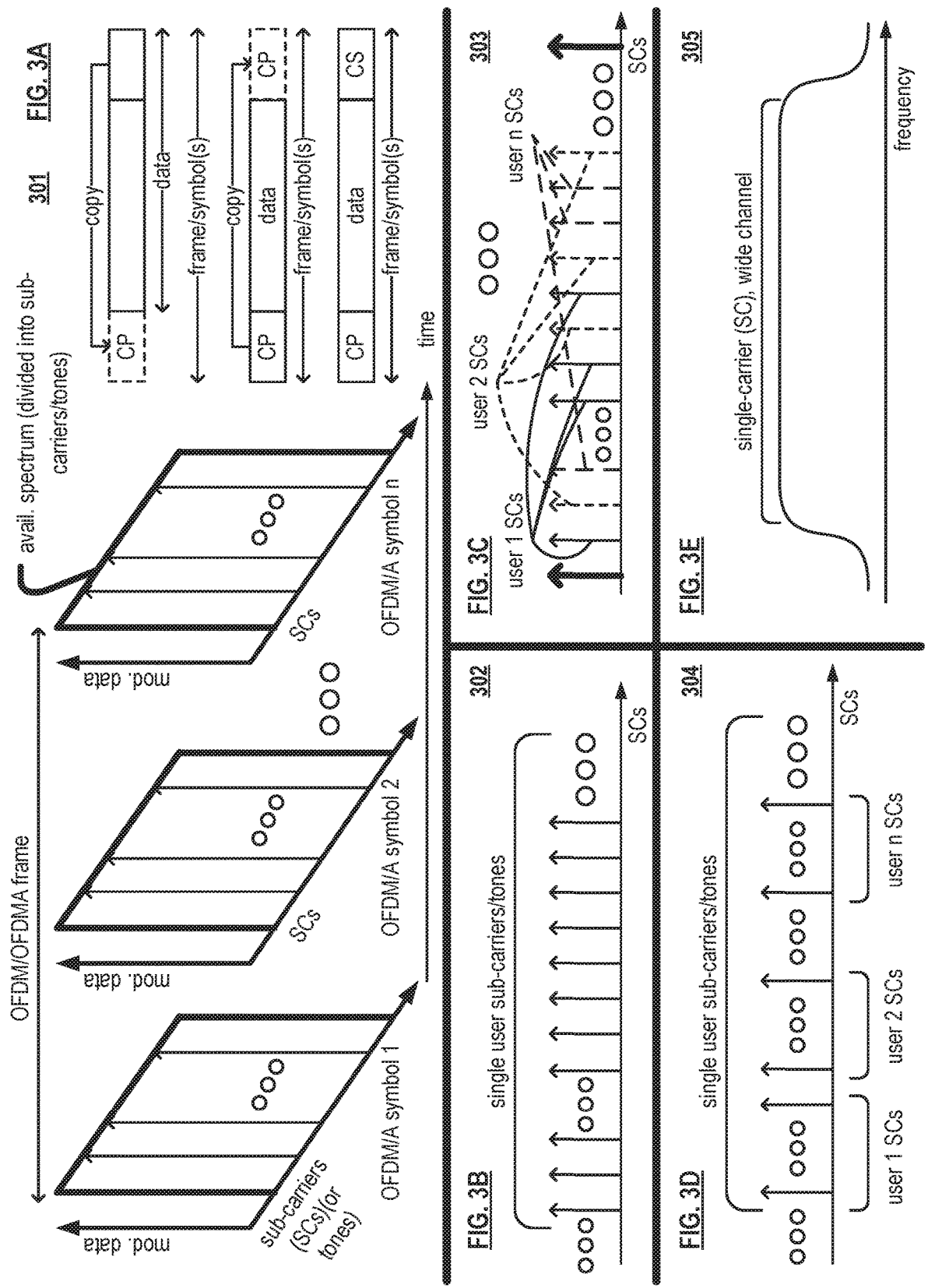

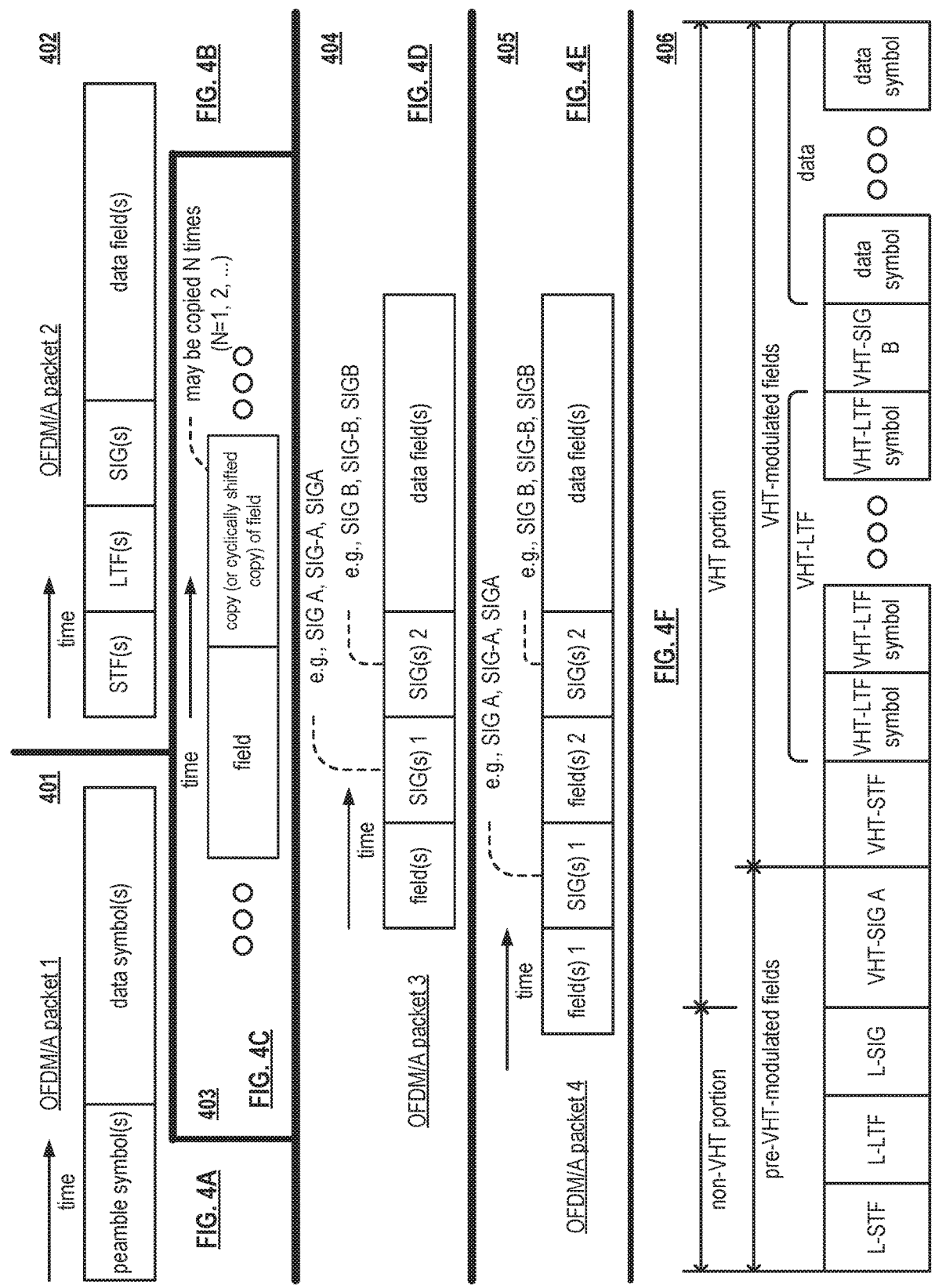

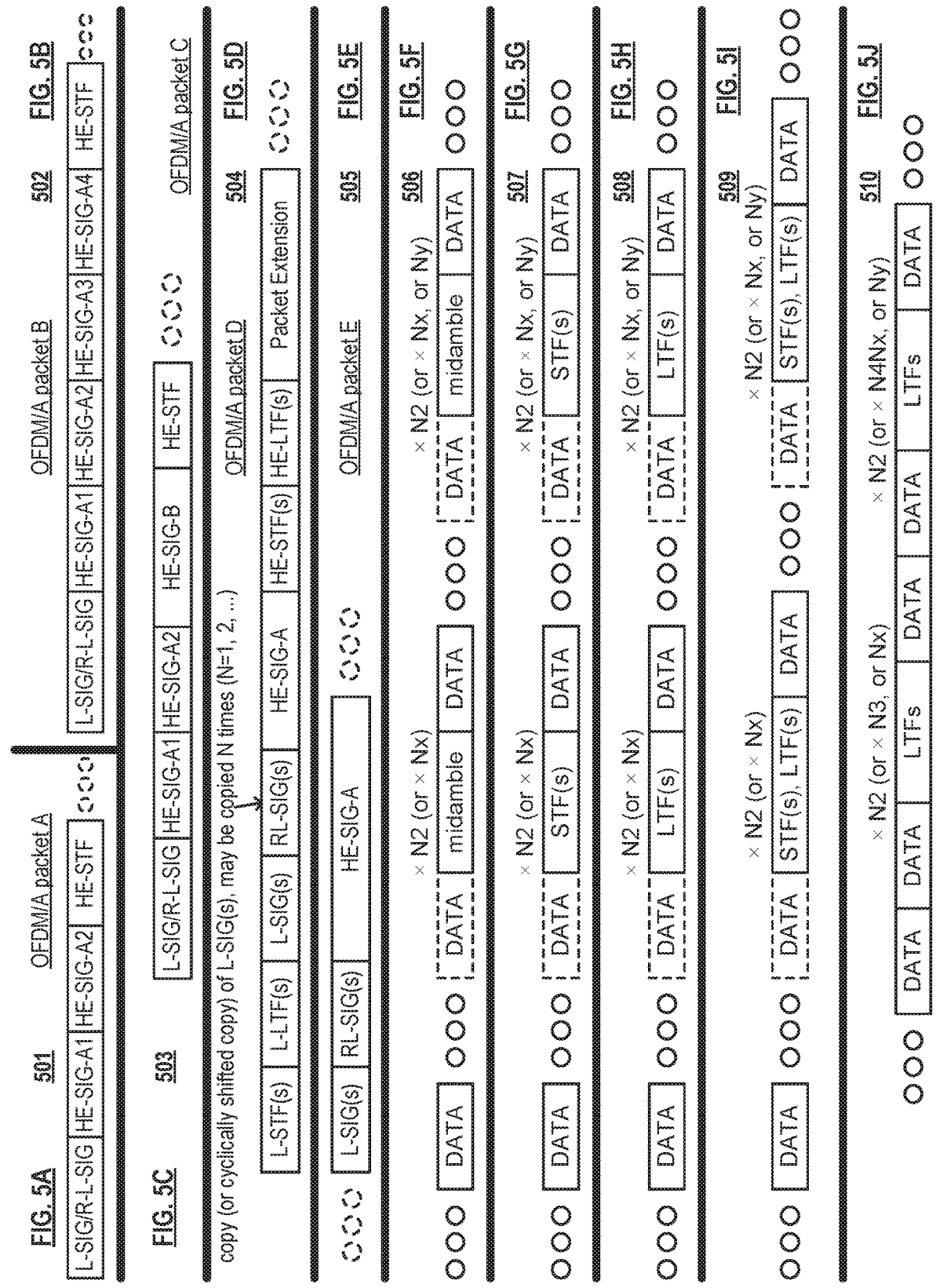

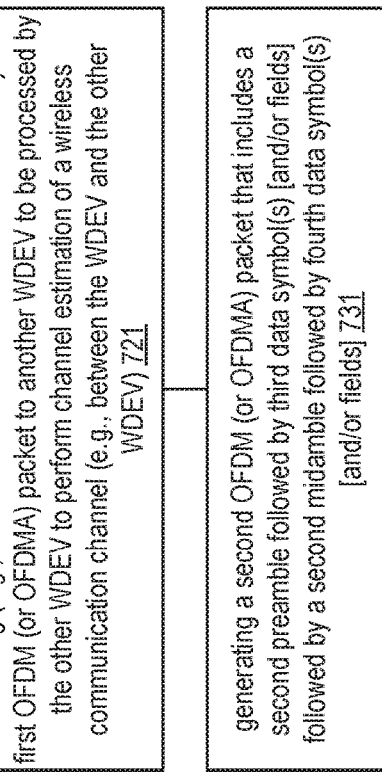

FIG. 7A 701 generating an OFDM (or OFDMA) packet that includes a preamble followed by first data symbol(s) [and/or fields] followed by a midamble followed by second data symbol(s) [and/or fields] 710 transmitting (e.g., via a communication interface of the WDEV) the OFDM (or OFDMA) packet to another wireless communication device (WDEV) to be processed by the other WDEV to perform channel estimation of a wireless communication channel (e.g., between the WDEV and the other WDEV) 720

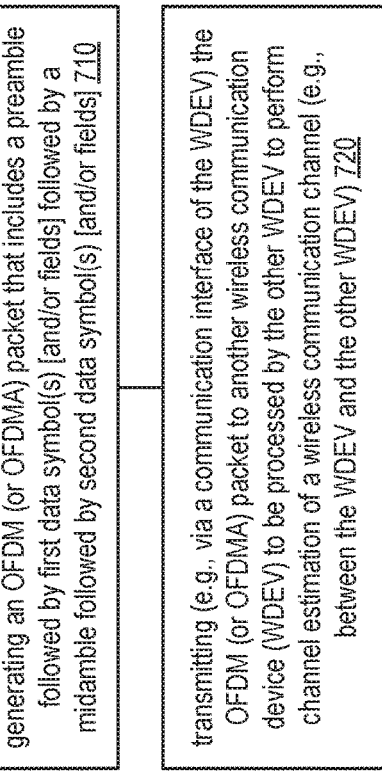

FIG. 7B 702 generating a first OFDM (or OFDMA) packet that includes a first preamble followed by first data symbol(s) [and/or fields] followed by a first midamble followed by second data symbol(s) [and/or fields] 711 transmitting (e.g., via a communication interface of the WDEV) the first OFDM (or OFDMA) packet to another WDEV to be processed by the other WDEV to perform channel estimation of a wireless communication channel (e.g., between the WDEV and the other WDEV) 721 generating a second OFDM (or OFDMA) packet that includes a second preamble followed by third data symbol(s) [and/or fields] followed by a second midamble followed by fourth data symbol(s) [and/or fields] 731 transmitting (e.g., via a communication interface of the WDEV) the second OFDM (or OFDMA) packet to the other WDEV to be processed by the other WDEV to perform channel estimation of the wireless communication channel 741

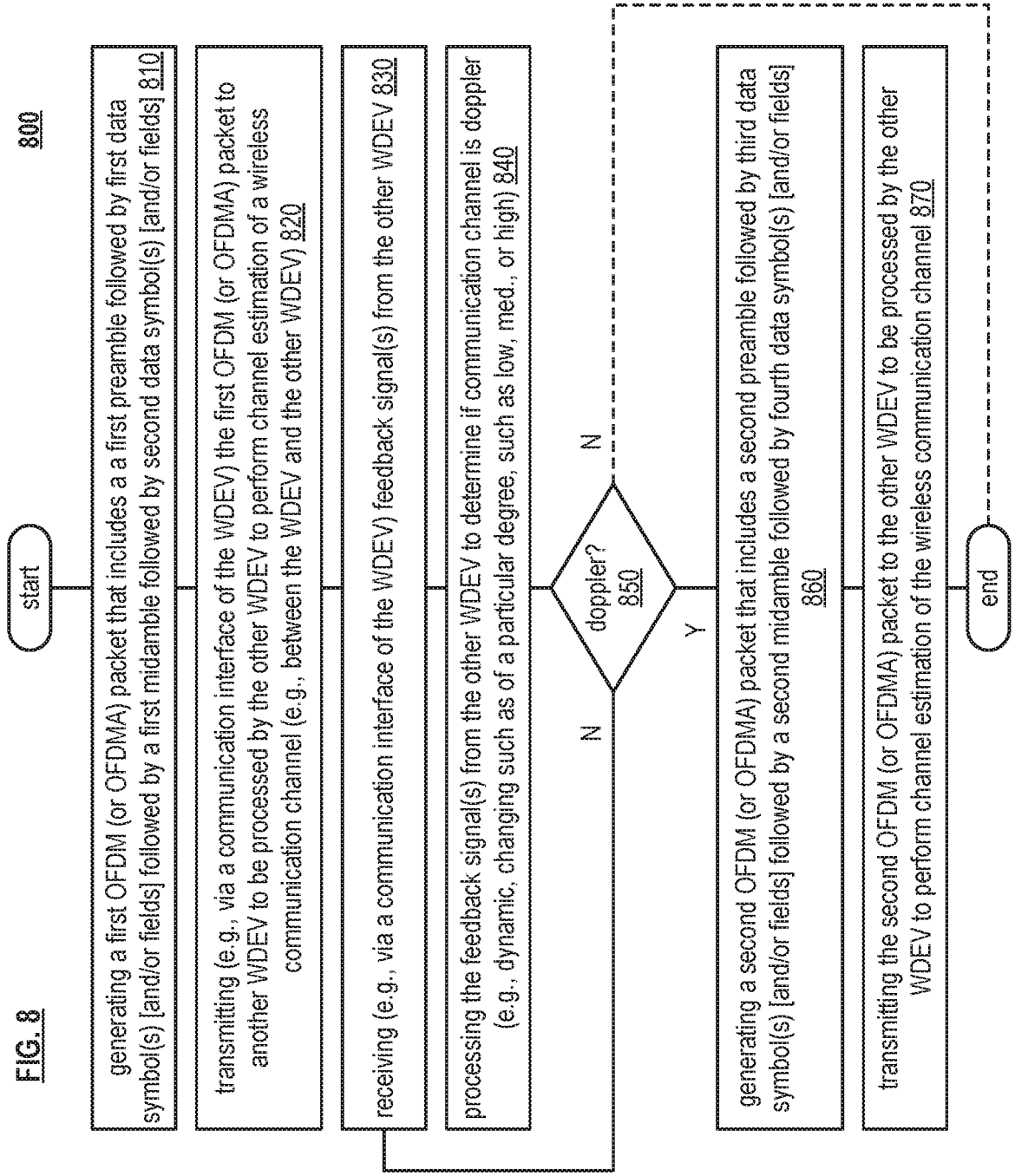

DOPPLER MIDAMBLE SIGNALING FOR WIRELESS COMMUNICATIONS

CROSS REFERENCE TO RELATED PATENTS/PATENT APPLICATIONS

Related Applications

The present U.S. Utility Patent Application claims priority pursuant to 35 U.S.C. § 120, as a continuation of U.S. Utility application Ser. No. 15/689,969, entitled "Doppler midamble signaling for wireless communications," filed on Aug. 29, 2017, which claims priority pursuant to 35 U.S.C. § 119(e) to U.S. Provisional Application No. 62/408,557, entitled "Rotating pilot and pilot patterns for wireless communications," filed Oct. 14, 2016, and which claims priority as a continuation-in-part (CIP) of U.S. Utility application Ser. No. 15/161,360, entitled "Peak to average power ratio (PAPR) reduction for repetition mode within single user, multiple user, multiple access, and/or MIMO wireless communications," filed on May 23, 2016, now issued as U.S. Pat. No. 9,780,846 on Oct. 3, 2017, which claims priority pursuant to 35 U.S.C. § 120 as a continuation of U.S. Utility application Ser. No. 13/954,492, entitled "Peak to average power ratio (PAPR) reduction for repetition mode within single user, multiple user, multiple access, and/or MIMO wireless communications," filed Jul. 30, 2013, now issued as U.S. Pat. No. 9,350,505 on May 24, 2016, which claims priority pursuant to 35 U.S.C. § 119(e) to U.S. Provisional Application No. 61/699,045, entitled "Peak to average power ratio (PAPR) reduction for repetition mode within single user, multiple user, multiple access, and/or MIMO wireless communications," filed Sep. 10, 2012; U.S. Provisional Application No. 61/750,280, entitled "Peak to average power ratio (PAPR) reduction for repetition mode within single user, multiple user, multiple access, and/or MIMO wireless communications," filed Jan. 8, 2013; U.S. Provisional Application No. 61/774,801, entitled "Peak to average power ratio (PAPR) reduction for repetition mode within single user, multiple user, multiple access, and/or MIMO wireless communications," filed Mar. 8, 2013; U.S. Provisional Application No. 61/809,656, entitled "Peak to average power ratio (PAPR) reduction for repetition mode within single user, multiple user, multiple access, and/or MIMO wireless communications," filed Apr. 8, 2013; and U.S. Provisional Application No. 61/842,601, entitled "Peak to average power ratio (PAPR) reduction for repetition mode within single user, multiple user, multiple access, and/or MIMO wireless communications," filed Jul. 3, 2013; all of which are hereby incorporated herein by reference in their entirety and made part of the present U.S. Utility patent application for all purposes.

U.S. Utility application Ser. No. 13/954,492 also claims priority pursuant to 35 U.S.C. § 120 as a continuation-in-part (CIP) of U.S. Utility application Ser. No. 13/454,033, entitled "Device coexistence within single user, multiple user, multiple access, and/or MIMO wireless communications," filed on Apr. 23, 2012, now issued as U.S. Pat. No. 8,774,124 on Jul. 8, 2014, which claims priority pursuant to 35 U.S.C. § 119(e) to U.S. Provisional Application No. 61/478,537, entitled "Preamble for use within multiple user, multiple access, and/or MIMO wireless communications," filed Apr. 24, 2011; U.S. Provisional Application No. 61/493,577, entitled "Preamble for use within multiple user, multiple access, and/or MIMO wireless communications," filed Jun. 6, 2011; U.S. Provisional Application No. 61/496,153, entitled "Preamble for use within multiple user, multiple access, and/or MIMO wireless communications," filed Jun. 13, 2011; U.S. Provisional Application No. 61/501,239, entitled "Preamble for use within multiple user, multiple access, and/or MIMO wireless communications," filed Jun. 26, 2011; U.S. Provisional Application No. 61/507,955, entitled "Preamble for use within multiple user, multiple access, and/or MIMO wireless communications," filed Jul. 14, 2011; U.S. Provisional Application No. 61/512,363, entitled "Preamble for use within multiple user, multiple access, and/or MIMO wireless communications," filed Jul. 27, 2011; U.S. Provisional Application No. 61/522,608, entitled "Preamble for use within multiple user, multiple access, and/or MIMO wireless communications," filed Aug. 11, 2011; U.S. Provisional Application No. 61/542,602, entitled "Preamble for use within single user, multiple user, multiple access, and/or MIMO wireless communications," filed Oct. 3, 2011; U.S. Provisional Application No. 61/561,722, entitled "Preamble for use within single user, multiple user, multiple access, and/or MIMO wireless communications," filed Nov. 18, 2011; U.S. Provisional Application No. 61/577,597, entitled "Preamble for use within single user, multiple user, multiple access, and/or MIMO wireless communications," filed Dec. 19, 2011; U.S. Provisional Application No. 61/584,142, entitled "Preamble for use within single user, multiple user, multiple access, and/or MIMO wireless communications," filed Jan. 6, 2012; U.S. Provisional Application No. 61/592,514, entitled "Preamble for use within single user, multiple user, multiple access, and/or MIMO wireless communications," filed Jan. 30, 2012; U.S. Provisional Application No. 61/595,616, entitled "Preamble for use within single user, multiple user, multiple access, and/or MIMO wireless communications," filed Feb. 6, 2012; U.S. Provisional Application No. 61/598,293, entitled "Preamble for use within single user, multiple user, multiple access, and/or MIMO wireless communications," filed Feb. 13, 2012; and U.S. Provisional Application No. 61/602,504, entitled "Preamble for use within single user, multiple user, multiple access, and/or MIMO wireless communications," filed Feb. 23, 2012; all of which are hereby incorporated herein by reference in their entirety and made part of the present U.S. Utility Patent Application for all purposes.

INCORPORATION BY REFERENCE

The following U.S. Utility Patent Applications are hereby incorporated herein by reference in their entirety and made part of the present U.S. Utility Patent Application for all purposes:

1. U.S. Utility patent application Ser. No. 13/453,703, entitled "Preamble for use within single user, multiple user, multiple access, and/or MIMO wireless communications," filed on Apr. 23, 2012, now issued as U.S. Pat. No. 9,184,969 on Nov. 10, 2015.

2. U.S. Utility patent application Ser. No. 13/453,998, entitled "Doppler adaptation using pilot patterns within single user, multiple user, multiple access, and/or MIMO wireless communications," filed on Apr. 23, 2012, now abandoned.

3. U.S. Utility patent application Ser. No. 13/454,010, entitled "Long training field (LTF) for use within single user, multiple user, multiple access, and/or MIMO wireless communications," filed on Apr. 23, 2012, now issued as U.S. Pat. No. 8,879,472 on Nov. 4, 2014.

4. U.S. Utility patent application Ser. No. 13/454,021, entitled "Short training field (STF) for use within single user, multiple user, multiple access, and/or MIMO wireless communications," filed on Apr. 23, 2012, now issued as U.S. Pat. No. 9,113,490 on Aug. 18, 2015.

5. U.S. Utility patent application Ser. No. 13/454,033, entitled "Device coexistence within single user, multiple user, multiple access, and/or MIMO wireless communications," filed on Apr. 23, 2012, now issued as U.S. Pat. No. 8,774,124 on Jul. 8, 2014.

BACKGROUND

Technical Field

The present disclosure relates generally to communication systems; and, more particularly, to signal processing within single user, multiple user, multiple access, and/or multiple-input-multiple-output (MIMO) wireless communications.

Description of Related Art

Communication systems support wireless and wire lined communications between wireless and/or wire lined communication devices. The systems can range from national and/or international cellular telephone systems, to the Internet, to point-to-point in-home wireless networks and can operate in accordance with one or more communication standards. For example, wireless communication systems may operate in accordance with one or more standards including, but not limited to, IEEE 802.11x (where x may be various extensions such as a, b, n, g, etc.), Bluetooth, advanced mobile phone services (AMPS), digital AMPS, global system for mobile communications (GSM), etc., and/or variations thereof.

In some instances, wireless communication is made between a transmitter (TX) and receiver (RX) using single-input-single-output (SISO) communication. Another type of wireless communication is single-input-multiple-output (SIMO) in which a single TX processes data into radio frequency (RF) signals that are transmitted to a RX that includes two or more antennas and two or more RX paths.

Yet an alternative type of wireless communication is multiple-input-single-output (MISO) in which a TX includes two or more transmission paths that each respectively converts a corresponding portion of baseband signals into RF signals, which are transmitted via corresponding antennas to a RX. Another type of wireless communication is multiple-input-multiple-output (MIMO) in which a TX and RX each respectively includes multiple paths such that a TX parallel processes data using a spatial and time encoding function to produce two or more streams of data and a RX receives the multiple RF signals via multiple RX paths that recapture the streams of data utilizing a spatial and time decoding function.

The prior art does not provide adequate means by which a wireless communication channel may be estimated and characterized. In addition, when a wireless communication channel is dynamic and/or changing over time, the prior art does not provide adequate means by which the various wireless communication devices using that wireless communication channel are informed of the current status of that wireless communication channel. There continues to exist room for improvement of how signal processing and operations may be performed by wireless communication devices within wireless communication systems.

BRIEF DESCRIPTION OF THE SEVERAL VIEWS OF THE DRAWINGS

FIG. 2A is a diagram illustrating an embodiment of dense deployment of wireless communication devices.

FIG. 2B is a diagram illustrating an example of communication between wireless communication devices.

FIG. 2C is a diagram illustrating another example of communication between wireless communication devices.

FIG. 3A is a diagram illustrating an example of orthogonal frequency division multiplexing (OFDM) and/or orthogonal frequency division multiple access (OFDMA).

FIG. 3B is a diagram illustrating another example of OFDM and/or OFDMA.

FIG. 3C is a diagram illustrating another example of OFDM and/or OFDMA.

FIG. 3D is a diagram illustrating another example of OFDM and/or OFDMA.

FIG. 3E is a diagram illustrating an example of single-carrier (SC) signaling.

FIG. 4A is a diagram illustrating an example of at least one portion of an OFDM/A packet.

FIG. 4B is a diagram illustrating another example of at least one portion of an OFDM/A packet of a second type.

FIG. 4C is a diagram illustrating an example of at least one portion of an OFDM/A packet of another type.

FIG. 4D is a diagram illustrating another example of at least one portion of an OFDM/A packet of a third type.

FIG. 4E is a diagram illustrating another example of at least one portion of an OFDM/A packet of a fourth type.

FIG. 4F is a diagram illustrating another example of at least one portion of an OFDM/A packet.

FIG. 5A is a diagram illustrating another example of at least one portion of an OFDM/A packet.

FIG. 5B is a diagram illustrating another example of at least one portion of an OFDM/A packet.

FIG. 5C is a diagram illustrating another example of at least one portion of an OFDM/A packet.

FIG. 5D is a diagram illustrating another example of at least one portion of an OFDM/A packet.

FIG. 5E is a diagram illustrating another example of at least one portion of an OFDM/A packet.

FIG. 5F is a diagram illustrating another example of at least one portion of an OFDM/A packet.

FIG. 5G is a diagram illustrating another example of at least one portion of an OFDM/A packet.

FIG. 5H is a diagram illustrating another example of at least one portion of an OFDM/A packet.

FIG. 5I is a diagram illustrating another example of at least one portion of an OFDM/A packet.

FIG. 5J is a diagram illustrating another example of at least one portion of an OFDM/A packet.

FIG. 7A is a diagram illustrating an embodiment of a method for execution by one or more wireless communication devices.

FIG. 7B is a diagram illustrating another embodiment of a method for execution by one or more wireless communication devices.

FIG. 8 is a diagram illustrating another embodiment of a method for execution by one or more wireless communication devices.

DETAILED DESCRIPTION

Figure 1:
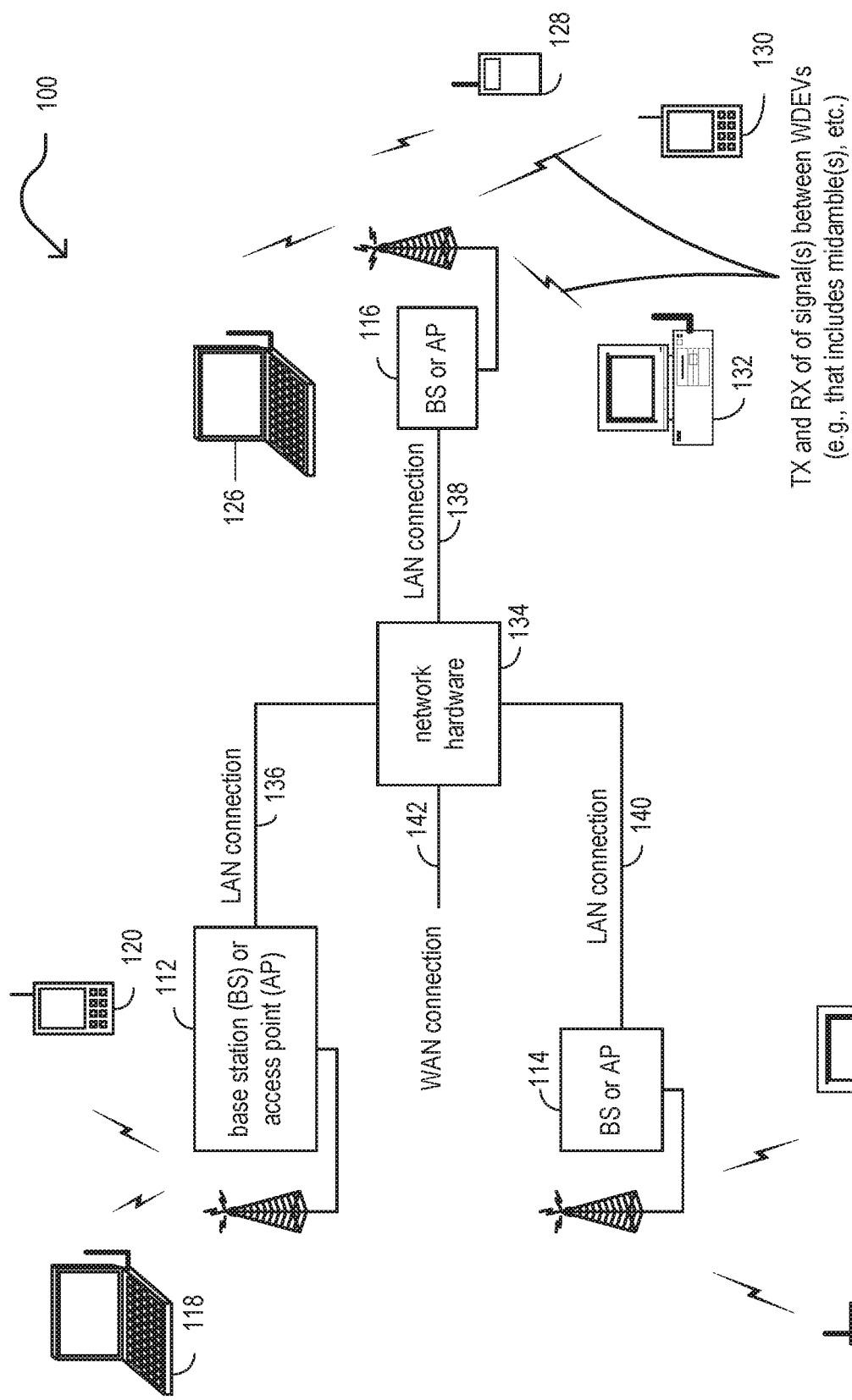
FIG. 1 is a diagram illustrating an embodiment of a wireless communication system.

FIG. 1 is a diagram illustrating an embodiment of a wireless communication system 100. The wireless communication system 100 includes base stations and/or access points 112-116, wireless communication devices 118-132 (e.g., wireless stations (STAs)), and a network hardware component 134. The wireless communication devices 118-132 may be laptop computers, or tablets, 118 and 126, personal digital assistants 120 and 130, personal computers 124 and 132 and/or cellular telephones 122 and 128. Other examples of such wireless communication devices 118-132 could also or alternatively include other types of devices that include wireless communication capability. The details of an embodiment of such wireless communication devices are described in greater detail with reference to FIG. 2B among other diagrams.

Some examples of possible devices that may be implemented to operate in accordance with any of the various examples, embodiments, options, and/or their equivalents, etc. described herein may include, but are not limited by, appliances within homes, businesses, etc. such as refrigerators, microwaves, heaters, heating systems, air conditioners, air conditioning systems, lighting control systems, and/or any other types of appliances, etc.; meters such as for natural gas service, electrical service, water service, Internet service, cable and/or satellite television service, and/or any other types of metering purposes, etc.; devices wearable on a user or person including watches, monitors such as those that monitor activity level, bodily functions such as heartbeat, breathing, bodily activity, bodily motion or lack thereof, etc.; medical devices including intravenous (IV) medicine delivery monitoring and/or controlling devices, blood monitoring devices (e.g., glucose monitoring devices) and/or any other types of medical devices, etc.; premises monitoring devices such as movement detection/monitoring devices, door closed/ajar detection/monitoring devices, security/alarm system monitoring devices, and/or any other type of premises monitoring devices; multimedia devices including televisions, computers, audio playback devices, video playback devices, and/or any other type of multimedia devices, etc.; and/or generally any other type(s) of device(s) that include(s) wireless communication capability, functionality, circuitry, etc. In general, any device that is implemented to support wireless communications may be implemented to operate in accordance with any of the various examples, embodiments, options, and/or their equivalents, etc. described herein.

The base stations (BSs) or access points (APs) 112-116 are operably coupled to the network hardware 134 via local area network connections 136, 138, and 140. The network hardware 134, which may be a router, switch, bridge, modem, system controller, etc., provides a wide area network connection 142 for the communication system 100. Each of the base stations or access points 112-116 has an associated antenna or antenna array to communicate with the wireless communication devices in its area. Typically, the wireless communication devices register with a particular base station or access point 112-116 to receive services from the communication system 100. For direct connections (i.e., point-to-point communications), wireless communication devices communicate directly via an allocated channel.

Any of the various wireless communication devices (WDEVs) 118-132 and BSs or APs 112-116 may include a processing circuitry and/or a communication interface to support communications with any other of the wireless communication devices 118-132 and BSs or APs 112-116. In an example of operation, a processing circuitry and/or a communication interface implemented within one of the devices (e.g., any one of the WDEVs 118-132 and BSs or APs 112-116) is/are configured to process at least one signal received from and/or to generate at least one signal to be transmitted to another one of the devices (e.g., any other one of the WDEVs 118-132 and BSs or APs 112-116).

Note that general reference to a communication device, such as a wireless communication device (e.g., WDEVs) 118-132 and BSs or APs 112-116 in FIG. 1, or any other communication devices and/or wireless communication devices may alternatively be made generally herein using the term 'device' (e.g., with respect to FIG. 2A below, "device 210" when referring to "wireless communication device 210" or "WDEV 210," or "devices 210-234" when referring to "wireless communication devices 210-234"; or with respect to FIG. 2B below, use of "device 310" may alternatively be used when referring to "wireless communication device 310", or "devices 390 and 391 (or 390-391)" when referring to wireless communication devices 390 and 391 or WDEVs 390 and 391). Generally, such general references or designations of devices may be used interchangeably.

The processing circuitry and/or the communication interface of any one of the various devices, WDEVs 118-132 and BSs or APs 112-116, may be configured to support communications with any other of the various devices, WDEVs 118-132 and BSs or APs 112-116. Such communications may be uni-directional or bi-directional between devices. Also, such communications may be uni-directional between devices at one time and bi-directional between those devices at another time.

In an example, a device (e.g., any one of the WDEVs 118-132 and BSs or APs 112-116) includes a communication interface and/or a processing circuitry (and possibly other possible circuitries, components, elements, etc.) to support communications with other device(s) and to generate and process signals for such communications. The communication interface and/or the processing circuitry operate to perform various operations and functions to effectuate such communications (e.g., the communication interface and the processing circuitry may be configured to perform certain operation(s) in conjunction with one another, cooperatively, dependently with one another, etc. and other operation(s) separately, independently from one another, etc.). In some examples, such a processing circuitry includes all capability, functionality, and/or circuitry, etc. to perform such operations as described herein. In some other examples, such a communication interface includes all capability, functionality, and/or circuitry, etc. to perform such operations as described herein. In even other examples, such a processing circuitry and a communication interface include all capability, functionality, and/or circuitry, etc. to perform such operations as described herein, at least in part, cooperatively with one another.

In an example of implementation and operation, a wireless communication device (e.g., any one of the WDEVs 118-132 and BSs or APs 112-116) includes a processing circuitry to support communications with one or more of the other wireless communication devices (e.g., any other of the WDEVs 118-132 and BSs or APs 112-116). For example, such a processing circuitry is configured to perform both processing operations as well as communication interface related functionality. Such a processing circuitry may be implemented as a single integrated circuit, a system on a chip, etc.

In another example of implementation and operation, a wireless communication device (e.g., any one of the WDEVs 118-132 and BSs or APs 112-116) includes a processing circuitry and a communication interface configured to support communications with one or more of the other wireless communication devices (e.g., any other of the WDEVs 118-132 and BSs or APs 112-116).

In an example of operation and implementation, BS/AP 116 supports communications with WDEVs 130, 132. The BS/AP 116 is configured to generate an orthogonal frequency division multiplexing (OFDM) packet that includes a preamble followed by a first one or more data symbols followed by a midamble followed by a second one or more data symbols. The BS/AP 116 is also configured to transmit the OFDM packet to another wireless communication device(s) (e.g., to WDEVs 130 and/or 132) to be processed by the other wireless communication device(s) (e.g., to WDEVs 130 and/or 132) to perform channel estimation of a wireless communication channel between the BS/AP 116 and the other wireless communication device(s) (e.g., to WDEVs 130 and/or 132) using at least one of the preamble or the midamble.

In an alternative example of operation and implementation, the WDEV 130 is configured to generate an OFDM packet that includes a preamble followed by a first one or more data symbols followed by a midamble followed by a second one or more data symbols. The WDEV 130 is also configured to transmit the OFDM packet to the BS/AP 116 to be processed by the BS/AP 116 to perform channel estimation of a wireless communication channel between the WDEV 130 and the BS/AP 116 using at least one of the preamble or the midamble.

FIG. 2A is a diagram illustrating an embodiment 201 of dense deployment of wireless communication devices (shown as WDEVs in the diagram). Any of the various WDEVs 210-234 may be access points (APs) or wireless stations (STAs). For example, WDEV 210 may be an AP or an AP-operative STA that communicates with WDEVs 212, 214, 216, and 218 that are STAs. WDEV 220 may be an AP or an AP-operative STA that communicates with WDEVs 222, 224, 226, and 228 that are STAs. In certain instances, at least one additional AP or AP-operative STA may be deployed, such as WDEV 230 that communicates with WDEVs 232 and 234 that are STAs. The STAs may be any type of one or more wireless communication device types including wireless communication devices 118-132, and the APs or AP-operative STAs may be any type of one or more wireless communication devices including as BSs or APs 112-116. Different groups of the WDEVs 210-234 may be partitioned into different basic services sets (BSSs). In some instances, at least one of the WDEVs 210-234 are included within at least one overlapping basic services set (OBSS) that cover two or more BSSs. As described above with the association of WDEVs in an AP-STA relationship, one of the WDEVs may be operative as an AP and certain of the WDEVs can be implemented within the same basic services set (BSS).

This disclosure presents novel architectures, methods, approaches, etc. that allow for improved spatial re-use for next generation WiFi or wireless local area network (WLAN) systems. Next generation WiFi systems are expected to improve performance in dense deployments where many clients and APs are packed in a given area (e.g., which may be an area [indoor and/or outdoor] with a high density of devices, such as a train station, airport, stadium, building, shopping mall, arenas, convention centers, colleges, downtown city centers, etc. to name just some examples). Large numbers of devices operating within a given area can be problematic if not impossible using prior technologies.

In an example of operation and implementation, WDEV 210 supports communications with WDEVs 214, 218. The WDEV 210 is configured to generate an OFDM packet that includes a preamble followed by a first one or more data symbols followed by a midamble followed by a second one or more data symbols. The WDEV 210 is also configured to transmit the OFDM packet to another wireless communication device(s) (e.g., to WDEVs 214 and/or 218) to be processed by the other wireless communication device(s) (e.g., to WDEVs 214 and/or 218) to perform channel estimation of a wireless communication channel between the WDEV 210 and the other wireless communication device(s) (e.g., to WDEVs 214 and/or 218) using at least one of the preamble or the midamble.

In an alternative example of operation and implementation, the WDEV 218 is configured to generate an OFDM packet that includes a preamble followed by a first one or more data symbols followed by a midamble followed by a second one or more data symbols. The WDEV 218 is also configured to transmit the OFDM packet to the WDEV 210 to be processed by the WDEV 210 to perform channel estimation of a wireless communication channel between the WDEV 218 and the WDEV 210 using at least one of the preamble or the midamble.

FIG. 2B is a diagram illustrating an example 202 of communication between wireless communication devices. A wireless communication device 310 (e.g., which may be any one of devices 118-132 as with reference to FIG. 1) is in communication with another wireless communication device 390 (and/or any number of other wireless communication devices up through another wireless communication device 391) via a transmission medium. The wireless communication device 310 includes a communication interface 320 to perform transmitting and receiving of at least one signal, symbol, packet, frame, etc. (e.g., using a transmitter 322 and a receiver 324) (note that general reference to packet or frame may be used interchangeably).

Generally speaking, the communication interface 320 is implemented to perform any such operations of an analog front end (AFE) and/or physical layer (PHY) transmitter, receiver, and/or transceiver. Examples of such operations may include any one or more of various operations including conversions between the frequency and analog or continuous time domains (e.g., such as the operations performed by a digital to analog converter (DAC) and/or an analog to digital converter (ADC)), gain adjustment including scaling, filtering (e.g., in either the digital or analog domains), frequency conversion (e.g., such as frequency upscaling and/or frequency downscaling, such as to a baseband frequency at which one or more of the components of the device 310 operates), equalization, pre-equalization, metric generation, symbol mapping and/or de-mapping, automatic gain control (AGC) operations, and/or any other operations that may be performed by an AFE and/or PHY component within a wireless communication device.

In some implementations, the wireless communication device 310 also includes a processing circuitry 330, and an associated memory 340, to execute various operations including interpreting at least one signal, symbol, packet, and/or frame transmitted to wireless communication device 390 and/or received from the wireless communication device 390 and/or wireless communication device 391. The wireless communication devices 310 and 390 (and/or 391) may be implemented using at least one integrated circuit in accordance with any desired configuration or combination of components, modules, etc. within at least one integrated circuit. Also, the wireless communication devices 310, 390, and/or 391 may each include one or more antennas for transmitting and/or receiving of at least one packet or frame (e.g., WDEV 390 may include m antennas, and WDEV 391 may include n antennas).

Also, in some examples, note that one or more of the processing circuitry 330, the communication interface 320 (including the TX 322 and/or RX 324 thereof), and/or the memory 340 may be implemented in one or more "processing modules," "processing circuits," "processors," and/or "processing units" or their equivalents. Considering one example, a system-on-a-chip (SOC) 330a may be implemented to include the processing circuitry 330, the communication interface 320 (including the TX 322 and/or RX 324 thereof), and the memory 340 (e.g., SOC 330a being a multi-functional, multi-module integrated circuit that includes multiple components therein). Considering another example, processing-memory circuitry 330b may be implemented to include functionality similar to both the processing circuitry 330 and the memory 340 yet the communication interface 320 is a separate circuitry (e.g., processing-memory circuitry 330b is a single integrated circuit that performs functionality of a processing circuitry and a memory and is coupled to and also interacts with the communication interface 320).

Considering even another example, two or more processing circuitries may be implemented to include the processing circuitry 330, the communication interface 320 (including the TX 322 and/or RX 324 thereof), and the memory 340. In such examples, such a "processing circuitry" or "processing circuitries" (or "processor" or "processors") is/are configured to perform various operations, functions, communications, etc. as described herein. In general, the various elements, components, etc. shown within the device 310 may be implemented in any number of "processing modules," "processing circuits," "processors," and/or "processing units" (e.g., 1, 2, . . . , and generally using N such "processing modules," "processing circuits," "processors," and/or "processing units", where N is a positive integer greater than or equal to 1).

In some examples, the device 310 includes both processing circuitry 330 and communication interface 320 configured to perform various operations. In other examples, the device 310 includes SOC 330a configured to perform various operations. In even other examples, the device 310 includes processing-memory circuitry 330b configured to perform various operations. Generally, such operations include generating, transmitting, etc. signals intended for one or more other devices (e.g., device 390 through 391) and receiving, processing, etc. other signals received for one or more other devices (e.g., device 390 through 391).

In some examples, note that the communication interface 320, which is coupled to the processing circuitry 330, that is configured to support communications within a satellite communication system, a wireless communication system, a wired communication system, a fiber-optic communication system, and/or a mobile communication system (and/or any other type of communication system implemented using any type of communication medium or media). Any of the signals generated and transmitted and/or received and processed by the device 310 may be communicated via any of these types of communication systems.

FIG. 2C is a diagram illustrating another example 203 of communication between wireless communication devices. In an example of operation and implementation, at or during a first time (e.g., time 1 (ΔT1 or DT1)), the WDEV 310 transmits signal(s) to WDEV 390, and/or the WDEV 390 transmits other signal(s) to WDEV 310. At or during a second time (e.g., time 2 (ΔT2 or DT2)), the WDEV 310 processes signal(s) received from WDEV 390, and/or the WDEV 390 processes signal(s) received from WDEV 310.

In some examples, the signal(s) communicated between WDEV 310 and WDEV 390 may include or be based on one or more formats including first one or more data symbols (and/or fields) followed by a midamble followed by a second one or more data symbols (and/or fields) for use in supporting communications between WDEV 310 and WDEV 390.

Considering a particular example, the WDEV 310 is configured to generate an OFDM packet that includes a preamble followed by a first one or more data symbols followed by a midamble followed by a second one or more data symbols and is also configured to transmit the OFDM packet to WDEV 390 and/or 391 to be processed by WDEV 390 and/or 391 to perform channel estimation of one or more wireless communication channels between WDEV 310 and WDEV 390 and/or 391 using at least one of the preamble or the midamble.

In some examples, the preamble includes a first one or more long training fields (LTFs) and the midamble includes a second one or more LTFs. Also, each of the first one or more LTFs and the second one or more LTFs includes a same number of LTFs (e.g., each includes N LTFs, where N is an integer greater than or equal to 1). Also, in some examples, the WDEV 390 and/or 391 is configured to process the OFDM packet to perform first one or more channel estimations of the wireless communication channel between the WDEV 310 and the WDEV 390 and/or 391 using the preamble and a second one or more channel estimations of the wireless communication channel(s) between the WDEV 310 and the WDEV 390 and/or 391 using the midamble.

Also, in certain examples, note that the preamble includes first one or more fields based on a first communication protocol followed by second one or more fields based on a second communication protocol. examples of such communication protocols may include different versions of IEEE 802.11 (e.g., IEEE 802.11, IEEE 802.11x, where x may be any of a, b, g, n, ac, ah, af, ax, and/or any other versions, amendments, extensions, variants, etc. of the IEEE 802.11). In addition, any other communication standards, protocols, and/or recommended practices may corresponds to the first communication protocol and the second communication protocol. In some specific examples, the first communication protocol is a legacy communication protocol to the second communication protocol. In one example, the first communication protocol is IEEE 802.11a, and the second communication protocol is IEEE 802.11b. In another example, the first communication protocol is IEEE 802.11a or IEEE 802.11b, and the second communication protocol is IEEE 802.11n.

Also, in some examples, the first one or more fields includes a first signal field (SIG), and the second one or more fields includes a second SIG followed by one or more short training fields (STFs) followed by a first one or more long training fields (LTFs). Note that the midamble includes a second one or more LTFs, and each of the first one or more LTFs and the second one or more LTFs includes a same number of LTFs.

In some alternative examples, the WDEV 310 is also configured to generate another OFDM packet that includes another preamble followed by a third one or more data symbols followed by another midamble followed by a fourth one or more data symbols. The WDEV 310 is also configured to transmit the other OFDM packet to the WDEV 390 and/or 391 to be processed by the WDEV 390 and/or 391 to perform channel estimation of at least one wireless communication channel between the WDEV 310 and the WDEV 390 and/or 391 using at least one of the other preamble or the other midamble.

In some examples, each of the first one or more data symbols and the second one or more data symbols includes a first same number of data symbols, and each of the third one or more data symbols and the fourth one or more data symbols includes a second same number of data symbols that is different than the first same number of data symbols.

In even other alternative examples, the WDEV 310 is also configured to perform a capabilities exchange with the WDEV 390 and/or 391 coordinate a doppler operational mode among a plurality of doppler operational modes including a low doppler operational mode, a medium doppler operational mode, and a high doppler operational mode. Note also that the doppler operational mode that is coordinated specifies a number of data symbols within each of the first one or more data symbols and the second one or more data symbols.

In addition, in some examples, note that the OFDM packet includes an orthogonal frequency division multiple access (OFDMA) packet that is modulated based on a plurality of OFDMA sub-carriers and includes first data intended for the WDEV 390 that is modulated within a first subset of the plurality of OFDMA sub-carriers and second data intended for the WDEV 391 that is modulated within a second subset of the plurality of OFDMA sub-carriers.

In another example of implementation and operation, the WDEV 310 includes both a processing circuitry to perform many of the operations described above and also includes a communication interface, coupled to the processing circuitry, that are configured in combination to support communications within a satellite communication system, a wireless communication system, a wired communication system, a fiber-optic communication system, and/or a mobile communication system. For example, certain operations may be performed by only the processing circuitry, other certain operations may be performed by only the communication interface, and even some other certain operations may be performed by both the processing circuitry and the communication interface.

FIG. 3A is a diagram illustrating an example 301 of orthogonal frequency division multiplexing (OFDM) and/or orthogonal frequency division multiple access (OFDMA). OFDM's modulation may be viewed as dividing up an available spectrum into a plurality of narrowband sub-carriers (e.g., relatively lower data rate carriers). The sub-carriers are included within an available frequency spectrum portion or band. This available frequency spectrum is divided into the sub-carriers or tones used for the OFDM or OFDMA symbols and packets/frames. Note that sub-carrier or tone may be used interchangeably. Typically, the frequency responses of these sub-carriers are non-overlapping and orthogonal. Each sub-carrier may be modulated using any of a variety of modulation coding techniques (e.g., as shown by the vertical axis of modulated data).

A communication device may be configured to perform encoding of one or more bits to generate one or more coded bits used to generate the modulation data (or generally, data). For example, a processing circuitry and the communication interface of a communication device may be configured to perform forward error correction (FEC) and/or error checking and correction (ECC) code of one or more bits to generate one or more coded bits. Examples of FEC and/or ECC may include turbo code, convolutional code, turbo trellis coded modulation (TTCM), low density parity check (LDPC) code, Reed-Solomon (RS) code, BCH (Bose and Ray-Chaudhuri, and Hocquenghem) code, binary convolutional code (BCC), Cyclic Redundancy Check (CRC), and/or any other type of ECC and/or FEC code and/or combination thereof, etc. Note that more than one type of ECC and/or FEC code may be used in any of various implementations including concatenation (e.g., first ECC and/or FEC code followed by second ECC and/or FEC code, etc. such as based on an inner code/outer code architecture, etc.), parallel architecture (e.g., such that first ECC and/or FEC code operates on first bits while second ECC and/or FEC code operates on second bits, etc.), and/or any combination thereof. The one or more coded bits may then undergo modulation or symbol mapping to generate modulation symbols. The modulation symbols may include data intended for one or more recipient devices. Note that such modulation symbols may be generated using any of various types of modulation coding techniques. Examples of such modulation coding techniques may include binary phase shift keying (BPSK), quadrature phase shift keying (QPSK), 8-phase shift keying (PSK), 16 quadrature amplitude modulation (QAM), 32 amplitude and phase shift keying (APSK), etc., uncoded modulation, and/or any other desired types of modulation including higher ordered modulations that may include even greater number of constellation points (e.g., 1024 QAM, etc.).

FIG. 3B is a diagram illustrating another example 302 of OFDM and/or OFDMA. A transmitting device transmits modulation symbols via the sub-carriers. Note that such modulation symbols may include data modulation symbols, pilot modulation symbols (e.g., for use in channel estimation, characterization, etc.) and/or other types of modulation symbols (e.g., with other types of information included therein). OFDM and/or OFDMA modulation may operate by performing simultaneous transmission of a large number of narrowband carriers (or multi-tones). In some applications, a guard interval (GI) or guard space is sometimes employed between the various OFDM symbols to try to minimize the effects of ISI (Inter-Symbol Interference) that may be caused by the effects of multi-path within the communication system, which can be particularly of concern in wireless communication systems.

In addition, as shown in right hand side of FIG. 3A, a cyclic prefix (CP) and/or cyclic suffix (CS) (e.g., shown in right hand side of FIG. 3A, which may be a copy of the CP) may also be employed within the guard interval to allow switching time (e.g., such as when jumping to a new communication channel or sub-channel) and to help maintain orthogonality of the OFDM and/or OFDMA symbols. In some examples, a certain amount of information (e.g., data bits) at the end portion of the data portion is/are copied and placed at the beginning of the data to form the frame/symbol(s). In a specific example, consider that the data includes data bits $x_0, x_1, \ldots, x_{N-Ncp}, \ldots, x_{N-1}$, where the $x_{N-Ncp}$ bit is the first bit of the end portion of the data portion that is to be copied, then the bits $x_{N-Ncp}, \ldots, x_{N-1}$, are copied and placed at the beginning of the frame/symbol(s). Note that such end portion of the data portion is/are copied and placed at the beginning of the data to form the frame/symbol(s) may also be shifted, cyclically shifted, and/or copied more than once, etc. if desired in certain embodiments. Generally speaking, an OFDM and/or OFDMA system design is based on the expected delay spread within the communication system (e.g., the expected delay spread of the communication channel).

In a single-user system in which one or more OFDM symbols or OFDM packets/frames are transmitted between a transmitter device and a receiver device, all of the sub-carriers or tones are dedicated for use in transmitting modulated data between the transmitter and receiver devices. In a multiple user system in which one or more OFDM symbols or OFDM packets/frames are transmitted between a transmitter device and multiple recipient or receiver devices, the various sub-carriers or tones may be mapped to different respective receiver devices as described below with respect to FIG. 3C.

FIG. 3C is a diagram illustrating another example 303 of OFDM and/or OFDMA. Comparing OFDMA to OFDM, OFDMA is a multi-user version of the popular orthogonal frequency division multiplexing (OFDM) digital modulation scheme. Multiple access is achieved in OFDMA by assigning subsets of sub-carriers to individual recipient devices or users. For example, first sub-carrier(s)/tone(s) may be assigned to a user 1, second sub-carrier(s)/tone(s) may be assigned to a user 2, and so on up to any desired number of users. In addition, such sub-carrier/tone assignment may be dynamic among different respective transmissions (e.g., a first assignment for a first packet/frame, a second assignment for second packet/frame, etc.). An OFDM packet/frame may include more than one OFDM symbol. Similarly, an OFDMA packet/frame may include more than one OFDMA symbol. In addition, such sub-carrier/tone assignment may be dynamic among different respective symbols within a given packet/frame or superframe (e.g., a first assignment for a first OFDMA symbol within a packet/frame, a second assignment for a second OFDMA symbol within the packet/frame, etc.). Generally speaking, an OFDMA symbol is a particular type of OFDM symbol, and general reference to OFDM symbol herein includes both OFDM and OFDMA symbols (and general reference to OFDM packet/frame herein includes both OFDM and OFDMA packets/frames, and vice versa). FIG. 3C shows example 303 where the assignments of sub-carriers to different users are intermingled among one another (e.g., sub-carriers assigned to a first user includes non-adjacent sub-carriers and at least one sub-carrier assigned to a second user is located in between two sub-carriers assigned to the first user). The different groups of sub-carriers associated with each user may be viewed as being respective channels of a plurality of channels that compose all of the available sub-carriers for OFDM signaling.

FIG. 3D is a diagram illustrating another example 304 of OFDM and/or OFDMA. In this example 304, the assignments of sub-carriers to different users are located in different groups of adjacent sub-carriers (e.g., first sub-carriers assigned to a first user include first adjacently located sub-carrier group, second sub-carriers assigned to a second user include second adjacently located sub-carrier group, etc.). The different groups of adjacently located sub-carriers associated with each user may be viewed as being respective channels of a plurality of channels that compose all of the available sub-carriers for OFDM signaling.

FIG. 3E is a diagram illustrating an example 305 of single-carrier (SC) signaling. SC signaling, when compared to OFDM signaling, includes a singular relatively wide channel across which signals are transmitted. In contrast, in OFDM, multiple narrowband sub-carriers or narrowband sub-channels span the available frequency range, bandwidth, or spectrum across which signals are transmitted within the narrowband sub-carriers or narrowband sub-channels.

Generally, a communication device may be configured to include a processing circuitry and the communication interface (or alternatively different respective configuration of circuitries, such as SOC 330a and/or processing-memory circuitry 330b shown in FIG. 2B) configured to process received OFDM and/or OFDMA symbols and/or frames (and/or SC symbols and/or frames) and to generate such OFDM and/or OFDMA symbols and/or frames (and/or SC symbols and/or frames).

FIG. 4A is a diagram illustrating an example 401 of at least one portion of an OFDM/A packet. This packet includes at least one preamble symbol followed by at least one data symbol. The at least one preamble symbol includes information for use in identifying, classifying, and/or categorizing the packet for appropriate processing.

FIG. 4B is a diagram illustrating another example 402 of at least one portion of an OFDM/A packet of a second type. This packet also includes a preamble and data. The preamble is composed of at least one short training field (STF), at least one long training field (LTF), and at least one signal field (SIG). The data is composed of at least one data field. In both this example 402 and the prior example 401, the at least one data symbol and/or the at least one data field may generally be referred to as the payload of the packet. Among other purposes, STFs and/or LTFs can be used to assist a device to identify that a frame is about to start, to synchronize timers, to select an antenna configuration, to set receiver gain, to set up certain of the modulation parameters for the remainder of the packet, to perform channel estimation for uses such as beamforming, etc. In some examples, one or more STFs are used for gain adjustment (e.g., such as automatic gain control (AGC) adjustment), and a given STF may be repeated one or more times (e.g., repeated 1 time in one example). In some examples, one or more LTFs are used for channel estimation, channel characterization, etc. (e.g., such as for determining a channel response, a channel transfer function, etc.), and a given LTF may be repeated one or more times (e.g., repeated up to 8 times in one example).

Among other purposes, the SIGs can include various information to describe the OFDM packet including certain attributes as data rate, packet length, number of symbols within the packet, channel width, modulation encoding, modulation coding set (MCS), modulation type, whether the packet as a single or multiuser frame, frame length, etc. among other possible information. This disclosure presents, among other things, a means by which a variable length second at least one SIG can be used to include any desired amount of information. By using at least one SIG that is a variable length, different amounts of information may be specified therein to adapt for any situation.

Various examples are described below for possible designs of a preamble for use in wireless communications as described herein.

FIG. 4C is a diagram illustrating another example 403 of at least one portion of at least one portion of an OFDM/A packet of another type. A field within the packet may be copied one or more times therein (e.g., where N is the number of times that the field is copied, and N is any positive integer greater than or equal to one). This copy may be a cyclically shifted copy. The copy may be modified in other ways from the original from which the copy is made.

FIG. 4D is a diagram illustrating another example 404 of at least one portion of an OFDM/A packet of a third type. In this example 404, the OFDM/A packet includes one or more fields followed by one or more first signal fields (SIG(s) 1) followed by one or more second signal fields (SIG(s) 2) followed by and one or more data field.

FIG. 4E is a diagram illustrating another example 405 of at least one portion of an OFDM/A packet of a fourth type. In this example 405, the OFDM/A packet includes one or more first fields followed by one or more first signal fields (SIG(s) 1) followed by one or more second fields followed by one or more second signal fields (SIG(s) 2) followed by and one or more data field.

FIG. 4F is a diagram illustrating another example 406 of at least one portion of an OFDM/A packet. Such a general preamble format may be backward compatible with prior IEEE 802.11 prior standards, protocols, and/or recommended practices.

In this example 406, the OFDM/A packet includes a legacy portion (e.g., at least one legacy short training field (STF) shown as L-STF, legacy signal field (SIG) shown as L-SIG) and a first signal field (SIG) (e.g., VHT [Very High Throughput] SIG (shown as SIG-A)). Then, the OFDM/A packet includes one or more other VHT portions (e.g., VHT short training field (STF) shown as VHT-STF, one or more VHT long training fields (LTFs) shown as VHT-LTF, a second SIG (e.g., VHT SIG (shown as SIG-B)), and one or more data symbols.

Various diagrams below are shown that depict at least a portion (e.g., preamble) of various OFDM/A packet designs.

FIG. 5A is a diagram illustrating another example 501 of at least one portion of an OFDM/A packet. In this example 501, the OFDM/A packet includes a signal field (SIG) and/or a repeat of that SIG that corresponds to a prior or legacy communication standard, protocol, and/or recommended practice relative to a newer, developing, etc. communication standard, protocol, and/or recommended practice (shown as L-SIG/R-L-SIG) followed by a first at least one SIG based on a newer, developing, etc. communication standard, protocol, and/or recommended practice (shown as HE-SIG-A1, e.g., where HE corresponds to high efficiency) followed by a second at least one SIG based on a newer, developing, etc. communication standard, protocol, and/or recommended practice (shown as HE-SIG-A2, e.g., where HE again corresponds to high efficiency) followed by a short training field (STF) based on a newer, developing, etc. communication standard, protocol, and/or recommended practice (shown as HE-STF, e.g., where HE again corresponds to high efficiency) followed by one or more fields.

FIG. 5B is a diagram illustrating another example 502 of at least one portion of an OFDM/A packet. In this example 502, the OFDM/A packet includes a signal field (SIG) and/or a repeat of that SIG that corresponds to a prior or legacy communication standard, protocol, and/or recommended practice relative to a newer, developing, etc. communication standard, protocol, and/or recommended practice (shown as L-SIG/R-L-SIG) followed by a first at least one SIG based on a newer, developing, etc. communication standard, protocol, and/or recommended practice (shown as HE-SIG-A1, e.g., where HE corresponds to high efficiency) followed by a second at least one SIG based on a newer, developing, etc. communication standard, protocol, and/or recommended practice (shown as HE-SIG-A2, e.g., where HE again corresponds to high efficiency) followed by a third at least one SIG based on a newer, developing, etc. communication standard, protocol, and/or recommended practice (shown as HE-SIG-A3, e.g., where HE again corresponds to high efficiency) followed by a fourth at least one SIG based on a newer, developing, etc. communication standard, protocol, and/or recommended practice (shown as HE-SIG-A4, e.g., where HE again corresponds to high efficiency) followed by a STF based on a newer, developing, etc. communication standard, protocol, and/or recommended practice (shown as HE-STF, e.g., where HE again corresponds to high efficiency) followed by one or more fields.

FIG. 5C is a diagram illustrating another example 502 of at least one portion of an OFDM/A packet. In this example 503, the OFDM/A packet includes a signal field (SIG) and/or a repeat of that SIG that corresponds to a prior or legacy communication standard, protocol, and/or recommended practice relative to a newer, developing, etc. communication standard, protocol, and/or recommended practice (shown as L-SIG/R-L-SIG) followed by a first at least one SIG based on a newer, developing, etc. communication standard, protocol, and/or recommended practice (shown as HE-SIG-A1, e.g., where HE corresponds to high efficiency) followed by a second at least one SIG based on a newer, developing, etc. communication standard, protocol, and/or recommended practice (shown as HE-SIG-A2, e.g., where HE again corresponds to high efficiency) followed by a third at least one SIG based on a newer, developing, etc. communication standard, protocol, and/or recommended practice (shown as HE-SIG-B, e.g., where HE again corresponds to high efficiency) followed by a STF based on a newer, developing, etc. communication standard, protocol, and/or recommended practice (shown as HE-STF, e.g., where HE again corresponds to high efficiency) followed by one or more fields. This example 503 shows a distributed SIG design that includes a first at least one SIG-A (e.g., HE-SIG-A1 and HE-SIG-A2) and a second at least one SIG-B (e.g., HE-SIG-B).

FIG. 5D is a diagram illustrating another example 504 of at least one portion of an OFDM/A packet. This example 504 depicts a type of OFDM/A packet that includes a preamble and data. The preamble is composed of at least one short training field (STF), at least one long training field (LTF), and at least one signal field (SIG).

In this example 504, the preamble is composed of at least one short training field (STF) that corresponds to a prior or legacy communication standard, protocol, and/or recommended practice relative to a newer, developing, etc. communication standard, protocol, and/or recommended practice (shown as L-STF(s)) followed by at least one long training field (LTF) that corresponds to a prior or legacy communication standard, protocol, and/or recommended practice relative to a newer, developing, etc. communication standard, protocol, and/or recommended practice (shown as L-LTF(s)) followed by at least one SIG that corresponds to a prior or legacy communication standard, protocol, and/or recommended practice relative to a newer, developing, etc. communication standard, protocol, and/or recommended practice (shown as L-SIG(s)) and optionally followed by a repeat (e.g., or cyclically shifted repeat) of the L-SIG(s) (shown as RL-SIG(s)) followed by another at least one SIG based on a newer, developing, etc. communication standard, protocol, and/or recommended practice (shown as HE-SIG-A, e.g., where HE again corresponds to high efficiency) followed by another at least one STF based on a newer, developing, etc. communication standard, protocol, and/or recommended practice (shown as HE-STF(s), e.g., where HE again corresponds to high efficiency) followed by another at least one LTF based on a newer, developing, etc.

communication standard, protocol, and/or recommended practice (shown as HE-LTF(s), e.g., where HE again corresponds to high efficiency) followed by at least one packet extension followed by one or more fields.

FIG. 5E is a diagram illustrating another example 505 of at least one portion of an OFDM/A packet. In this example 505, the preamble is composed of at least one field followed by at least one SIG that corresponds to a prior or legacy communication standard, protocol, and/or recommended practice relative to a newer, developing, etc. communication standard, protocol, and/or recommended practice (shown as L-SIG(s)) and optionally followed by a repeat (e.g., or cyclically shifted repeat) of the L-SIG(s) (shown as RL-SIG (s)) followed by another at least one SIG based on a newer, developing, etc. communication standard, protocol, and/or recommended practice (shown as HE-SIG-A, e.g., where HE again corresponds to high efficiency) followed by one or more fields.

Note that information included in the various fields in the various examples provided herein may be encoded using various encoders. In some examples, two independent binary convolutional code (BCC) encoders are implemented to encode information corresponding to different respective modulation coding sets (MCSs) that are can be selected and/or optimized with respect to, among other things, the respective payload on the respective channel. Various communication channel examples are described with respect to FIG. 6D below.

Also, in some examples, a wireless communication device generates content that is included in the various SIGs (e.g., SIGA and/or SIGB) to signal MCS(s) to one or more other wireless communication devices to instruct which MCS(s) for those one or more other wireless communication devices to use with respect to one or more communications. In addition, in some examples, content included in a first at least one SIG (e.g., SIGA) include information to specify at least one operational parameter for use in processing a second at least one SIG (e.g., SIGB) within the same OFDM/A packet.

Various OFDM/A frame structures are presented herein for use in communications between wireless communication devices and specifically showing OFDM/A frame structures corresponding to one or more resource units (RUs). Such OFDM/A frame structures may include one or more RUs. Note that these various examples may include different total numbers of sub-carriers, different numbers of data sub-carriers, different numbers of pilot sub-carriers, etc. Different RUs may also have different other characteristics (e.g., different spacing between the sub-carriers, different sub-carrier densities, implemented within different frequency bands, etc.).

FIG. 5F is a diagram illustrating another example 506 of at least one portion of an OFDM/A packet. Generally speaking, a portion of the OFDM/A packet includes a data portion that includes one or more data symbols (and/or fields) followed by a midamble followed by another one or more data symbols (and/or fields). In certain examples, the other one or more data symbols (and/or fields) are also followed by another midamble. In some examples, the other midamble is also followed by yet one or more other data symbols (and/or fields).

To combat fast fading, channel estimates may need to be updated during the DATA portion of the packet (e.g., during the data symbol(s) and/or field(s) of an OFDM/A packet). To address this situation, one or more portions of a preamble and/or midamble may be periodically repeated.

FIG. 5G is a diagram illustrating another example 507 of at least one portion of an OFDM/A packet. This diagram shows an alternative in which the midamble is composed of one or more short training fields (STFs).

FIG. 5H is a diagram illustrating another example 508 of at least one portion of an OFDM/A packet. This diagram shows an alternative in which the midamble is composed of one or more long training fields (LTFs).

FIG. 5I is a diagram illustrating another example 509 of at least one portion of an OFDM/A packet. This diagram shows an alternative in which the midamble is composed of a particular combination of one or more STFs and one or more LTFs.

FIG. 5J is a diagram illustrating another example 510 of at least one portion of an OFDM/A packet. As also mentioned above with respect to other examples, to combat fast fading, channel estimates may need to be updated during the DATA portion of the packet (e.g., during the data symbol(s) and/or field(s) of an OFDM/A packet). To address this situation, single user (SU) or multi-user (MU) LTFs may be periodically repeated. One or more short training fields (STFs) may precede each set of long training fields (LTFs) for more accurate gain estimation. Cyclic prefix of the LTFs can be used for automatic gain control (AGC) and/or AGC estimation.

If desired, rotating pilots (e.g., known sub-carriers that are included in predetermined/known locations for use in performing channel estimation/characterization) may also be utilized. For example, a subset of pilots may be implemented to be included at different positions over consecutive OFDM symbols. The pilots over time span the frequency band of interest (e.g., the signal bandwidth). Puncturing of the data subcarriers can be used to augment data pilots.

Additional preamble structure considerations may be made. For example, if one or more of the fields in the preamble has more than one symbol, then information about different frame formats may be conveyed on the consecutive symbols such as in accordance with an encrypted pre-SIG-A field before the bits of the SIG-A field begin to arrive using any one or more of the following: different symbol content, inverted polarity, and/or phase shifts.

The number of symbols of each field may vary (e.g., N1 (or Nx), N2 (or Nx or Ny), SIG-A, SIG-B, etc.). As such, the size of the packet may be modified/varied indirectly in accordance with a modification/variation of the preamble size. The variability of such differing numbers of symbols in each field may be made using any one or more of the following: on the pre-configured basis, on the semi-static basis, and/or dynamically, per packet basis.

The number of symbols of each field may vary (e.g., N1 (or Nx), N2 (or Nx or Ny), SIG-A, SIG-B, etc.) depending on any number of factors, including any one or more of the following: application (usage scenario), modulation & coding set/rate (MCS) of the data, signal to noise ratio (SNR) requirement, desired range, and/or desired power consumption.

In some examples, signaling is performed in a portion of the OFDM/A packet (e.g., in an early, beginning, and/or first portion of the OFDM/A packet) to indicate certain characteristics of one or more remaining portions of the OFDM/A packet (e.g., in a later, ending, and/or second portion of the OFDM/A packet). For example, considering an example of content of a signal field (SIG) (e.g., of a particular preamble such as for a particular type of OFDM/A packet. One example may correspond to a particular type of OFDM/A packet that includes preamble of an Extended Range Preamble. Examples of content of such a preamble may include one or more of the following: length such as in units of four symbols—6 bits (supports 5 milli-seconds packets), modulation & coding set/rate (MCS)—2 bits (lowest 4 rates), multiple-input-multiple-output (MIMO) mode—2 bits (cycle delay diversity (CDD), Space-Time Block Code (STBC), rank-1 beamforming (BF), reserved), doppler—2 bits (signal periodicity of mid packet LTF for refreshing the channel estimation or other methods to enable Doppler support), bandwidth (BW)/band location—4 bits, short guard interval (SGI)/long guard interval (LGI)—1 bit, coding—2 bit, parity—1 bit, tail—6 bits, etc. such as including a total—26 bits. Note that such examples of number of bits may be varied in alternative examples, and different respective content may alternatively be included in other examples.

In general, a certain number of bit(s) (e.g., 2 bits, 3 bits, and/or different numbers of bits) may be used to indicate certain characteristics of the midamble and packet format to be used. For example, one bit in one field and another bit in another field cooperatively indicate certain characteristics of the midamble and packet format to be used. Examples of such parameters include any one or more of the following: to indicate whether a doppler operational mode is to be used, to indicate what type of doppler operational mode of a number of operational modes (e.g., low, medium, and high) is to be used when doppler is to be performed, value for N being the repetition of the midamble such that N indicates how many times and/or the number of data symbols that are repeated between the midambles (e.g., of the LTFs that may be included in the midambles), the number M of after how many data symbols is another midamble inserted (e.g., after how many data symbols are the new LTFs injected), etc. Note that such parameters may vary and be adapted at different times to different values based on any of a number of considerations (e.g., changed doppler, mobility of wireless communication device(s) in the wireless communication system, change(s) of characteristic(s) of one or more wireless communication channels within the wireless communication system, change(s) of environmental conditions of the wireless communication system, and/or other consideration(s)).

Figures 6A, 6B, 6C:
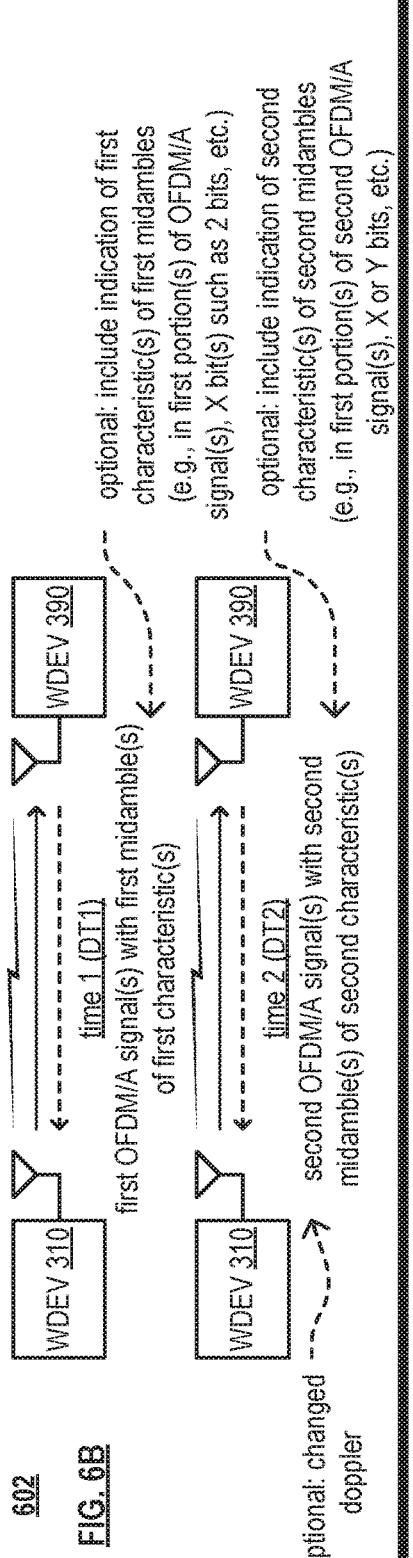
FIG. 6A illustrates an example of at least one portion of an OFDM/A packet having a high Doppler frame format.
FIG. 6B is a diagram illustrating another example of communication between wireless communication devices.
FIG. 6C is a diagram illustrating another example of communication between wireless communication devices.

FIG. 6A illustrates an example of at least one portion of an OFDM/A packet having a high doppler frame format. With respect to various high doppler frame format Options (e.g., such as continued from FIG. 5J and the written description associated therewith). The various options described here may be generally understood to refer to the repeating of the midamble (e.g., LTFs for SU or MU may be periodically repeated). For example, a mid-amble comprising of one STF and one or more LTF may be added every N DATA symbols. Any one of a variety of different options may be used.

Option 1:

The doppler frame format support is optional and part of the capabilities exchange. The transmitter wireless communication device (e.g., access point (AP)) decides whether or not to use this operational mode. One value for N is specified in the specification and could be somewhere between 30 to 80 symbols (or generally between two numbers X1 and X2) with an overhead between approximately 10% to 4% (or generally between two percentages Y1% and Y2%).

Option 1a:

Same as Option 1 described above with up to 4 values for N specified in the specification for different respective modulations (e.g., 2/4/16/64QAM). In such an embodiment, the receiver wireless communication device (e.g., wireless station (STA)) combines the MCS information with the doppler bit to know the mid-amble periodicity.

Option 1b:

In this embodiment, instead of signaling one value of N as in Option 1 above, the SIG field uses 2 bits to signal up to 3 values of N allowing the transmitter wireless communication device (e.g., AP) better to match the channel doppler for the appropriate option of no doppler, low doppler, medium doppler and high doppler.

Option 2:

Doppler frame format support is mandatory at the transmitter. All transmissions use a mid-amble every 80-100 symbols (or generally between two numbers Z1 and Z2) with overhead less than some desired percentage (e.g., <4%). This option simplifies an outdoor access point (AP) operation as it guarantees robust operation of beacons and low MCS under high doppler without the need for feedback from specific users. The receiver wireless communication device (e.g., STA) doesn't have to update the channel estimation, and the receiver communication device (e.g., STA) can simply skip those 3 symbols. Receiver wireless communication devices (e.g., STAs) only need to understand where a mid-amble is place in the frame. If the SIG field bit is set to a value of one (1), the transmitter wireless communication device (e.g., AP) may be implemented to place a mid-amble every certain number of symbols (e.g., every 30 or so symbols) with overhead increase to some desired percentage (e.g., 10%). It is noted that this can be done only with receiver wireless communication devices (e.g., STAs) that declare 'receive doppler format capability'.

In order to enable the receiver wireless communication device (e.g., STA) to request high doppler frame format, it is also proposed herein to add a capability to the VHT control field to be used with unsolicited feedback to enable the receiver to request high doppler frame format.

Referring again to FIG. 6A, while using the reserved bit B1 is possible, it is also proposed herein to instead re-use the Group ID (GID) related information including GID-L and GID-H bits B6-B8 and B24-B26, as these bits are used to signal the GID in case of response to MU-MIMO packet and values 0 and 63 are reserved for SU-MIMO.

It is also proposed that if the unsolicited MFB bit is set to 1 and the FB is generated from an SU PLCP Protocol Data Unit (PPDU) (where PLCP is Physical Layer Convergence Procedure PLCP), then signaling all zeros (value 0) in the GID-L and GID-H fields may be implemented to indicate a request for a high doppler frame format (e.g., otherwise, use the all ones (i.e., 11 . . . 111 for depicting a value of 63) as in IEEE 802.11ac).

With respect to determining when to use high doppler Frame format, a receiver wireless communication device (e.g., STA) may be implemented to measure communication channel variation across the packet to decide if the communication channel is rapidly changing (e.g., typically mobility of a wireless communication device may be viewed as lasting for several seconds and doesn't change fast that a decision may be viewed as being good or acceptable at least for a relatively short period of time). Also, the measurement of communication channel variation may be difficult in packets that do not have a mid-amble. Also, an improved approach may be effectuated by the receiver wireless communication device (e.g., STA) requesting a high doppler frame format in order to aid it in measuring communication channel variation (e.g., from preamble to mid-amble) by comparing the LTF symbols during the preamble and mid-amble.

FIG. 6B is a diagram illustrating another example 602 of communication between wireless communication devices. The WDEV 310 is configured to support communications with WDEV 390. In an example of operation and implementation, at or during a first time (e.g., time 1 (ΔT1 or DT1)), the WDEV 310 transmits signal(s) to WDEV 390, and/or the WDEV 390 transmits other signal(s) to WDEV 310. At or during a second time (e.g., time 2 (ΔT2 or DT2)), the WDEV 310 processes signal(s) received from WDEV 390, and/or the WDEV 390 processes signal(s) received from WDEV 310.

In some examples, the WDEV 310 is firstly configured to transmit first one or more OFDM/A signals that have first one or more midambles of first one or more characteristics. For example, such first one or more OFDM/A signals may include a first number of midambles and a first number of repetitions of a certain one or more types of fields (e.g., STF, LTF, and/or other fields). The first one or more OFDM/A signals may also include a first number of data symbols (and/or fields) between the respective midambles of the first number of midambles.

Then, the WDEV 310 is secondly configured to transmit to WDEV 390 second one or more OFDM/A signals that have second one or more midambles of second one or more characteristics. Analogously, such second one or more OFDM/A signals may include a second number of midambles and a second number of repetitions of a certain one or more types of fields (e.g., STF, LTF, and/or other fields). The second one or more OFDM/A signals may also include a second number of data symbols (and/or fields) between the respective midambles of the second number of midambles.

In some examples, the first one or more OFDM/A signals may respectively include information therein (e.g., 2 bits, a first bit from a first field and a second bit from a second field, and/or other implementation, etc.) to indicate the first one or more characteristics. Analogously, the second one or more OFDM/A signals may respectively include information therein (e.g., 2 bits, a first bit from a first field and a second bit from a second field, and/or other implementation, etc.) to indicate the second one or more characteristics. Note that such parameters may vary and be adapted at different times to different values based on any of a number of considerations (e.g., changed doppler, mobility of wireless communication device(s) in the wireless communication system, change(s) of characteristic(s) of one or more wireless communication channels within the wireless communication system, change(s) of environmental conditions of the wireless communication system, and/or other consideration(s)).

FIG. 6C is a diagram illustrating another example 603 of communication between wireless communication devices. In this example, the WDEV 310 is firstly configured to transmit to WDEV 390 first one or more OFDM/A signals that have first one or more midambles of first one or more characteristics. For example, such first one or more OFDM/A signals may include a first number of midambles and a first number of repetitions of a certain one or more types of fields (e.g., STF, LTF, and/or other fields). The first one or more OFDM/A signals may also include a first number of data symbols (and/or fields) between the respective midambles of the first number of midambles.

Then, the WDEV 310 is secondly configured to receive from WDEV 390 one or more feedback signals that include information regarding channel estimation, channel characterization, etc. of one or more communication channels between WDEV 310 and WDEV 390. Based on information included within the one or more feedback signals, WDEV 310 then selects parameters by which subsequent OFDM/A signals are to be generated and transmitted to WDEV 390.

Then, based on the selected parameters, the WDEV 310 is thirdly configured to transmit second one or more OFDM/A signals that have second one or more midambles of second one or more characteristics. Analogously, such second one or more OFDM/A signals may include a second number of midambles and a second number of repetitions of a certain one or more types of fields (e.g., STF, LTF, and/or other fields). The second one or more OFDM/A signals may also include a second number of data symbols (and/or fields) between the respective midambles of the second number of midambles.

FIG. 7A is a diagram illustrating an embodiment of a method 701 for execution by one or more wireless communication devices. The method 701 begins by generating an orthogonal frequency division multiplexing (OFDM) or orthogonal frequency division multiple access (OFDMA) (OFDM/A) packet that includes a preamble followed by a first one or more data symbols (and/or fields) followed by a midamble followed by a second one or more data symbols (and/or fields) (block 710).

The method 701 continues by transmitting (e.g., via a communication interface of the wireless communication device) the OFDM/A packet to another wireless communication device to be processed by the other wireless communication device to perform channel estimation of at least one wireless communication channel between the wireless communication device and the other wireless communication device using the preamble and/or the midamble (block 720).

FIG. 7B is a diagram illustrating another embodiment of a method 702 for execution by one or more wireless communication devices. The method 702 begins by generating a first OFDM/A packet that includes a first preamble followed by a first one or more data symbols (and/or fields) followed by a first midamble followed by a second one or more data symbols (and/or fields) (block 711).

The method 702 continues by transmitting (e.g., via a communication interface of the wireless communication device) the first OFDM/A packet to another wireless communication device to be processed by the other wireless communication device to perform channel estimation of at least one wireless communication channel between the wireless communication device and the other wireless communication device using the first preamble and/or the midamble (block 721).

The method 702 then operates by generating a second OFDM/A packet that includes a second preamble followed by a third one or more data symbols (and/or fields) followed by a second midamble followed by a fourth one or more data symbols (and/or fields) (block 731).

The method 702 continues by transmitting (e.g., via a communication interface of the wireless communication device) the second OFDM/A packet to the other wireless communication device to be processed by the other wireless communication device to perform channel estimation of at least one wireless communication channel between the wireless communication device and the other wireless communication device using the second preamble and/or the second midamble (block 741).

FIG. 8 is a diagram illustrating another embodiment of a method 800 for execution by one or more wireless communication devices. The method 800 begins by generating a first OFDM/A packet that includes a first preamble followed by a first one or more data symbols (and/or fields) followed by a first midamble followed by a second one or more data symbols (and/or fields) (block 810).

The method 800 continues by transmitting (e.g., via a communication interface of the wireless communication device) the first OFDM/A packet to another wireless communication device to be processed by the other wireless communication device to perform channel estimation of at least one wireless communication channel between the wireless communication device and the other wireless communication device using the first preamble and/or the midamble (block 820).

The method 800 continues by receiving (e.g., via a communication interface of the wireless communication device) one or more feedback signals from the other wireless communication device (block 830). The method 800 continues by processing the one or more feedback signals to determine if the at least one communication channel is doppler (e.g., dynamic, changing such as of a particular degree, such as low, med., or high) (block 840).

Based on a determination that the at least one communication channel is doppler in decision block 850, the method 800 branches to block 860. Alternatively, based on a determination that the at least one communication channel is not doppler in decision block 850, the method 800 branches to block 830 in one example and alternatively ends in another example.

The method 800 then operates by generating a second OFDM/A packet that includes a second preamble followed by a third one or more data symbols (and/or fields) followed by a second midamble followed by a fourth one or more data symbols (and/or fields) (block 860). The parameters by which the second OFDM/A packet is generated may be based on the information included within the one or more feedback signals received from the other wireless communication device.

The method 800 continues by transmitting (e.g., via a communication interface of the wireless communication device) the second OFDM/A packet to the other wireless communication device to be processed by the other wireless communication device to perform channel estimation of at least one wireless communication channel between the wireless communication device and the other wireless communication device using the second preamble and/or the second midamble (block 870).

It is noted that the various operations and functions described within various methods herein may be performed within a wireless communication device (e.g., such as by the processing circuitry 330, communication interface 320, and memory 340 or other configuration of circuitries such as SOC 330a and/or processing-memory circuitry 330b such as described with reference to FIG. 2B) and/or other components therein. Generally, a communication interface and processing circuitry (or alternatively a processing circuitry that includes communication interface functionality, components, circuitry, etc.) in a wireless communication device can perform such operations.

Examples of some components may include one or more baseband processing modules, one or more media access control (MAC) layer components, one or more physical layer (PHY) components, and/or other components, etc. For example, such a processing circuitry can perform baseband processing operations and can operate in conjunction with a radio, analog front end (AFE), etc. The processing circuitry can generate such signals, packets, frames, and/or equivalents etc. as described herein as well as perform various operations described herein and/or their respective equivalents.

In some embodiments, such a baseband processing module and/or a processing module (which may be implemented in the same device or separate devices) can perform such processing to generate signals for transmission to another wireless communication device using any number of radios and antennas. In some embodiments, such processing is performed cooperatively by a processing circuitry in a first device and another processing circuitry within a second device. In other embodiments, such processing is performed wholly by a processing circuitry within one device.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to," "operably coupled to," "coupled to," and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to," "operable to," "coupled to," or "operably coupled to" indicates that an item includes one or more of power connections, input(s), output(s), etc., to perform, when activated, one or more its corresponding functions and may further include inferred coupling to one or more other items. As may still further be used herein, the term "associated with," includes direct and/or indirect coupling of separate items and/or one item being embedded within another item.

As may be used herein, the term "compares favorably" or equivalent, indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module," "processing circuit," "processor," and/or "processing unit" or their equivalents may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processing circuitries, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, a processing circuitry, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A wireless communication device comprising:
a communication interface; and
processing circuitry that is coupled to the communication interface, wherein at least one of the communication interface or the processing circuitry configured to:
receive, from another wireless communication device, an orthogonal frequency division multiplexing (OFDM) packet that includes a preamble followed by a first one or more data symbols followed by a midamble followed by a second one or more data symbols
perform channel estimation of a wireless communication channel between the wireless communication device and the another wireless communication device using at least one of the preamble or the midamble;
receive, from the another wireless communication device, another OFDM packet that includes another preamble followed by a third one or more data symbols followed by another midamble followed by a fourth one or more data symbols; and
perform channel estimation of the wireless communication channel between the wireless communication device and the another wireless communication device using at least one of the another preamble or the another midamble; and
wherein:
each of the first one or more data symbols and the second one or more data symbols includes a first same number of data symbols, and
each of the third one or more data symbols and the fourth one or more data symbols includes a second same number of data symbols that is different than the first same number of data symbols.

2. The wireless communication device of claim 1, wherein:
the preamble includes a first one or more long training fields (LTFs) and the midamble includes a second one or more LTFs; and
each of the first one or more LTFs and the second one or more LTFs includes a same number of LTFs.

3. The wireless communication device of claim 1, wherein at least one of the communication interface or the processing circuitry is further configured to:
perform a first channel estimation of the wireless communication channel between the wireless communication device and the another wireless communication device using the preamble, and perform a second channel estimation of the wireless communication channel between the wireless communication device and the another wireless communication device using the midamble.

4. The wireless communication device of claim 1, wherein:
the preamble includes a first one or more fields based on a first communication protocol followed by a second one or more fields based on a second communication protocol;
the first communication protocol is a legacy communication protocol to the second communication protocol;
the first one or more fields includes a first signal field (SIG);
the second one or more fields includes a second SIG followed by one or more short training fields (STFs) followed by a first one or more long training fields (LTFs);
the midamble includes a second one or more LTFs; and
each of the first one or more LTFs and the second one or more LTFs includes a same number of LTFs.

5. The wireless communication device of claim 1, wherein the at least one of the communication interface or the processing circuitry is further configured to:
perform a capabilities exchange with the another wireless communication device to coordinate a doppler operational mode among a plurality of doppler operational modes including a low doppler operational mode, a medium doppler operational mode, and a high doppler operational mode, wherein the doppler operational mode that is coordinated specifies a number of data symbols within each of the first one or more data symbols and the second one or more data symbols.

6. The wireless communication device of claim 1, wherein the OFDM packet includes an orthogonal frequency division multiple access (OFDMA) packet that is modulated based on a plurality of OFDMA sub-carriers and includes first data intended for the another wireless communication device that is modulated within a first subset of the plurality of OFDMA sub-carriers and second data intended for at least one other wireless communication device that is modulated within a second subset of the plurality of OFDMA sub-carriers.

7. The wireless communication device of claim 1 further comprising:
an access point (AP), wherein the another wireless communication device includes a wireless station (STA).

8. The wireless communication device of claim 1 further comprising:
a wireless station (STA), wherein the another wireless communication device includes an access point (AP).

9. A wireless communication device comprising:
a communication interface; and
processing circuitry that is coupled to the communication interface, wherein at least one of the communication interface or the processing circuitry configured to:
perform a capabilities exchange with another wireless communication device to coordinate a doppler operational mode among a plurality of doppler operational modes including a low doppler operational mode, a medium doppler operational mode, and a high doppler operational mode, wherein the doppler operational mode that is coordinated specifies a number of data symbols within each of a first one or more data symbols and a second one or more data symbols of an orthogonal frequency division multiple access (OFDMA) packet;
receive, from the another wireless communication device, an OFDM packet that includes a preamble followed by the first one or more data symbols followed by a midamble followed by the second one or more data symbols, wherein the preamble includes a first one or more long training fields (LTFs) and the midamble includes a second one or more LTFs, and wherein each of the first one or more LTFs and the second one or more LTFs includes a same number of LTFs;
perform a first channel estimation of a wireless communication channel between the wireless communication device and the another wireless communication device using the preamble and perform a second channel estimation of the wireless communication channel between the wireless communication device and the another wireless communication device using the midamble;
receive, from the another wireless communication device, another OFDM packet that includes another preamble followed by a third one or more data symbols followed by another midamble followed by a fourth one or more data symbols;
perform a third channel estimation of the wireless communication channel between the wireless communication device and the another wireless communication device using the another preamble, and perform a fourth channel estimation of the wireless communication channel between the wireless communication device and the another wireless communication device using the another midamble; and
wherein:
each of the first one or more data symbols and the second one or more data symbols includes a first same number of data symbols, and
each of the third one or more data symbols and the fourth one or more data symbols includes a second same number of data symbols that is different than the first same number of data symbols.

10. The wireless communication device of claim 9, wherein:
the preamble includes a first one or more fields based on a first communication protocol followed by a second one or more fields based on a second communication protocol;
the first communication protocol is a legacy communication protocol to the second communication protocol;
the first one or more fields includes a first signal field (SIG);
the second one or more fields includes a second SIG followed by one or more short training fields (STFs) followed by the first one or more LTFs; and
the midamble includes the second one or more LTFs.

11. The wireless communication device of claim 9, wherein the OFDM packet includes an orthogonal frequency division multiple access (OFDMA) packet that is modulated based on a plurality of OFDMA sub-carriers and includes first data intended for the another wireless communication device that is modulated within a first subset of the plurality of OFDMA sub-carriers and second data intended for at least one other wireless communication device that is modulated within a second subset of the plurality of OFDMA sub-carriers.

12. The wireless communication device of claim 9, further comprising:
an access point (AP), wherein the another wireless communication device includes a wireless station (STA).

13. The wireless communication device of claim 9, further comprising:
a wireless station (STA), wherein the another wireless communication device includes an access point (AP).

14. A method for execution by a wireless communication device, the method comprising:
receiving, via a communication interface of the wireless communication device from another wireless communication device, an orthogonal frequency division multiplexing (OFDM) packet that includes a preamble followed by a first one or more data symbols followed by a midamble followed by a second one or more data symbols;
performing a channel estimation of a wireless communication channel between the wireless communication device and the another wireless communication device using at least one of the preamble or the midamble;
receiving, via the communication interface from the another wireless communication device, another OFDM packet that includes another preamble followed by a third one or more data symbols followed by another midamble followed by a fourth one or more data symbols; and
performing channel estimation of the wireless communication channel between the wireless communication device and the another wireless communication device using at least one of the another preamble or the another midamble; and
wherein:
each of the first one or more data symbols and the second one or more data symbols includes a first same number of data symbols, and
each of the third one or more data symbols and the fourth one or more data symbols includes a second same number of data symbols that is different than the first same number of data symbols.

15. The method of claim 14, wherein:
the preamble includes a first one or more long training fields (LTFs) and the midamble includes a second one or more LTFs; and
each of the first one or more LTFs and the second one or more LTFs includes a same number of LTFs.

16. The method of claim 14, further comprising performing a first channel estimation of the wireless communication channel between the wireless communication devices using the preamble and a second channel estimation of the wireless communication channel between the wireless communication device using the midamble.

17. The method of claim 14, wherein:
the preamble includes a first one or more fields based on a first communication protocol followed by a second one or more fields based on a second communication protocol;
the first communication protocol is a legacy communication protocol to the second communication protocol;
the first one or more fields includes a first signal field (SIG);
the second one or more fields includes a second SIG followed by one or more short training fields (STFs) followed by a first one or more long training fields (LTFs);
the midamble includes a second one or more LTFs; and
each of the first one or more LTFs and the second one or more LTFs includes a same number of LTFs.

18. The method of claim 14, further comprising:
performing a capabilities exchange with the another wireless communication device to coordinate a doppler operational mode among a plurality of doppler operational modes including a low doppler operational mode, a medium doppler operational mode, and a high doppler operational mode, wherein the doppler operational mode that is coordinated specifies a number of data symbols within each of the first one or more data symbols and the second one or more data symbols.

19. The method of claim 14, wherein the OFDM packet includes an orthogonal frequency division multiple access (OFDMA) packet that is modulated based on a plurality of OFDMA sub-carriers and includes first data intended for the another wireless communication device that is modulated within a first subset of the plurality of OFDMA sub-carriers and second data intended for at least one other wireless communication device that is modulated within a second subset of the plurality of OFDMA sub-carriers.

20. The method of claim 14, wherein the wireless communication device includes a wireless station (STA), and the another wireless communication device includes an access point (AP).

* * * * *